US009544734B2

(12) United States Patent
Turgeman et al.

(10) Patent No.: US 9,544,734 B2
(45) Date of Patent: Jan. 10, 2017

(54) INTEGRATED NETWORK BASED E-COMMERCE AND ANALYSIS SYSTEMS AND METHODS

(75) Inventors: Avi Turgeman, Jerusalem (IL); Jonathan Ellman, Herzliya (IL); Oren Barzilai, Tel Aviv (IL); Amir Hamenahem, Herzliya (IL); Daniel Almog, Ramat Aviv (IL)

(73) Assignee: NSOF Connect Ltd., Tel Aviv (IL)

( * ) Notice: Subject to any disclaimer, the term of this patent is extended or adjusted under 35 U.S.C. 154(b) by 0 days.

(21) Appl. No.: 13/510,266

(22) PCT Filed: Nov. 16, 2010

(86) PCT No.: PCT/IL2010/000944
§ 371 (c)(1),
(2), (4) Date: May 16, 2012

(87) PCT Pub. No.: WO2011/058563
PCT Pub. Date: May 19, 2011

(65) Prior Publication Data

US 2013/0005331 A1 Jan. 3, 2013

Related U.S. Application Data

(60) Provisional application No. 61/261,409, filed on Nov. 16, 2009, provisional application No. 61/261,420, (Continued)

(51) Int. Cl.

| | |
|---|---|
| *H04W 4/00* | (2009.01) |
| *H04M 3/42* | (2006.01) |
| *G06Q 30/00* | (2012.01) |
| *H04W 4/02* | (2009.01) |
| *G06Q 30/06* | (2012.01) |

(52) U.S. Cl.
CPC ............ *H04W 4/028* (2013.01); *G06Q 30/06* (2013.01)

(58) Field of Classification Search
USPC ..... 455/426.1, 414.1; 705/14.4, 14.51, 14.57
See application file for complete search history.

(56) References Cited

U.S. PATENT DOCUMENTS 5,917,913 A 6/1999 Wang
5,969,968 A 10/1999 Pentel
(Continued)

OTHER PUBLICATIONS

International Search Report; International Application No. PCT/IL2010/000944; International Filing Date: Nov. 16, 2010; Date of Mailing: Apr. 14, 2011; 2 pages.
(Continued)

*Primary Examiner* — Omoniyi Obayanju
(74) *Attorney, Agent, or Firm* — White & Case LLP

(57) ABSTRACT

Systems and method are provided for forming an integrated communication network. The network includes a plurality of locally distributed integrated communications modules (ICMs) which are placed at predetermined positions. The ICMs monitor a plurality of roaming communication devices that communicate using both the cellular communication network and the internet. Further, the integrated communication network forms a private database on the roaming sender communication device to allow data communication with a specifically identified roaming communication device.

18 Claims, 11 Drawing Sheets

Related U.S. Application Data filed on Nov. 16, 2009, provisional application No. 61/261,416, filed on Nov. 16, 2009.

(56) References Cited

U.S. PATENT DOCUMENTS

| | | | | |
|---|---|---|---|---|
| 6,601,037 | B1 | 7/2003 | Kolls | |
| 2003/0220835 | A1* | 11/2003 | Barnes, Jr. | 705/14 |
| 2004/0093268 | A1* | 5/2004 | Ramchandani et al. | 705/14 |
| 2004/0110503 | A1 | 6/2004 | Park | |
| 2005/0009525 | A1* | 1/2005 | Evslin | 455/445 |
| 2007/0027803 | A1 | 2/2007 | Brandes et al. | |
| 2008/0109317 | A1* | 5/2008 | Singh | 705/14 |
| 2008/0215436 | A1* | 9/2008 | Roberts | 705/14 |

OTHER PUBLICATIONS

Written Opinion of International Searching Authority; International Application No. PCT/IL2010/000944; International Filing Date: Nov. 16, 2010; Date of Mailing: Apr. 14, 2011; 4 pages.

* cited by examiner

INTEGRATED NETWORK BASED E-COMMERCE AND ANALYSIS SYSTEMS AND METHODS

CROSS-REFERENCE TO RELATED APPLICATIONS

The present application claims the benefit of PCT/IL2010/000944 entitled: "INTEGRATED NETWORK BASED E-COMMERCE AND ANALYSIS SYSTEMS AND METHODS" filed on Nov. 10, 2010, which claims priority to U.S. Provisional Applications No. 61/261,409 entitled "INTEGRATED COMMUNICATION ADVANCED BUSINESS METHODS AND SYSTEM", 61/261,416 entitled "INTEGRATED COMMUNICATION ADVACED MOBILE COMMERCE SYSTEM AND METHOD", and 61/261,420 entitled "INTEGRATION COMMUNICATION ADVANCE BUSINESS METHODS AND SYSTEM" all were filed on Nov. 16, 2009, which is incorporated herein by reference in its entirety.

BACKGROUND OF THE INVENTION

The present invention generally relates to systems and methods for e-commerce, networking, sale processing, and point of sale transactions, sales analysis including sales taking place over public communication systems, and including integration with other communication networks.

With the advent of making cellular phones communication with both internet and other communication media possible, systems and methods have been developed to enable point of sales transactions using cellular telephones and other mobile devices.

U.S. Pat. No. 5,917,913, to Wang et al., discloses a method and apparatus for approving a transaction request between an electronic transaction system and a portable electronic authorization device (PEAD), carried by a user using an electronic service authorization token. In one aspect of the invention, the method and apparatus include a remote agent server that provides a bridge between the electronic transaction system and the PEAD.

U.S. Pat. No. 5,969,968, to Pentel, describes a generalized remote ordering apparatus for customer and employee use within a restaurant, auto repair facility, retail store, grocery store, airport, or other service facility, to place orders, determine the status of orders, access information, and allow the customer to pay the bill either by cash or credit card, comprising: (a) an input device having a keypad, a battery, a first memory, a first processor, and a transmitter; and (b) an ordering station unconnected to the input device, the ordering station having a receiver tuned to the transmitter, a second processor adapted to decode information received from the transmitter through the receiver and produce decoded information, a display adapted to display the decoded information, a second memory adapted to store item numbers and prices, and a communications link to a point-of-sale system.

US2007027803 AA to Cantero et al., describes a system and a process for processing payments and transactions between payers and payees associated to the system, using a first server interconnected with telecommunication means with first data storage means containing information on each associated payer consisting of an admissible telephone number, an authorization criterion for authorizing a transaction, and a safety criterion associated to the admissible telephone number, as well as an admissible identification code of each payee; second data storage means that contain a second information referring to the type of digital mobile telephone belonging to each telephone number, selecting means for verifying one of the telecommunication equipments that communicates with the digital mobile telephone identified by the admissible telephone number.

U.S. Pat. No. 6,601,037, to Kolls, describes a public, private, or cellular phone with access to the Internet for the purposes of transacting e-mail, e-commerce, and e-business and for communicating voice and data. In addition the invention relates to a universal advertising and payment system and method for networking, monitoring and effectuating e-mail, e-commerce, and e-business and controlling vending equipment and applications. Vending equipment can be networked to each other through a first network, programmable and accessible by a PC, server, point of sale (POS) system, property or management information system (PMS/MIS), and networked to a second network. The first network and second network can be the same network. Complete control of a vending machine's functionality including usage, control, diagnostics, inventory, and marketing data capture can be effectuated locally or by remote connection to the network. Remote connection to the network includes Internet type connections, telecommunication (telephone, ISDN, ADSL), VSAT satellite, and other wire and wireless transmission.

However, in light of the known POS systems and methods, there is still a need to provide POS systems which are personalized to a user's needs and provide time-saving real time information to the user.

The disclosures of all publications and patent documents mentioned in the specification, and of the publications and patent documents cited therein directly or indirectly, are hereby incorporated by reference in their entirety.

BRIEF SUMMARY OF THE INVENTION

It is an object of some aspects of the present invention to provide a versatile integrated communication system and method, which enables versatile point of sales for system users.

One or more of the embodiments of the present invention provide methods and systems for performing a business transaction, the methods include monitoring a plurality of roaming communication devices, each device capable of communicating via both a cellular communication network and an internet network; deploying a plurality of locally distributed integrated communication modules (ICMs), each ICM placed at a predetermined position and each unit including at least one global communication module; at least one local communication module; and an interface for communication between the at least one global communication module and the at least one local communication module; and providing position-dependent data to each roaming device responsive to the real time position data, thereby enabling a user of each device to perform a business transaction employing the position-dependent data.

In additional embodiments of the present invention, mobile devices are provided with a communication module which enables them to identify nearby POS using a local or global network and to interact with the POS using the local or global medium and further to interact with their surroundings via local or global network.

The GLocal network system is further adapted to provide internet websites. These websites reflect all compiled activity scanned by one or more mobile clients. The GLocal network system further extends a user's physical world into a virtual mine of information.

The GLocal network system further comprises a plurality of Servers. These servers manage the flow of data/information in the network. They are further constructed and configured to perform real time synchronization between a mobile client and an Internet website. These servers are further constructed and configured to perform advanced data mining, suitable for at least one of personal use and commercial use.

According to one embodiment of the present invention, the GLocal network system comprises a multiplicity of bluetooth nodes, or ICMs, which are static agents, disposed in restaurants, stores and community gathering places.

The GLocal network system further provides for interactive functionality for customers, who are in proximity to the business. In additional embodiments of the present invention, there is provided a unique social and M-Commerce platform powered by integrating the mobile's capabilities into a combined local and global network.

According to some embodiments of the present invention, the providing step includes providing the authorization of payment to a point of sale (POS) terminal at a first physical location. Additionally, according to some embodiments of the present invention, the receiving step is performed at the first physical location.

Moreover, according to some embodiments of the present invention, the first physical location is selected from the group consisting of; a store, a ready food and beverage supplier, a gas station, a theater, a cinema, a stadium, a product supplier and a service supplier. According to some embodiments of the present invention, the receiving step is performed at a second physical location. Furthermore, according to some embodiments of the present invention, the providing step is performed via the server.

According to some embodiments of the present invention, the server is a dedicated global and local communication server. Yet further, according to some embodiments of the present invention, the item of value is includes at least of a) a product and b) a service.

According to some embodiments of the present invention, the ordering step further includes reporting real time position data of the communication device to at least one of the networks. According to some additional embodiments of the present invention, the at least one global communication module communicates via a wireless wide area network (wWAN). Yet further, according to some embodiments of the present invention, the at least one local communication module communicates via a wireless local area network (wLAN) connection.

According to some further embodiments of the present invention, the predetermined position includes a set of global positioning system (GPS) coordinates. Moreover, according to some embodiments of the present invention, the predetermined position includes a set of local positioning system (LPS) coordinates.

According to some embodiments of the present invention, each locally distributed communication module includes at least one unique identifier. Yet further, according to some embodiments of the present invention, each roaming communication device includes a system browser. Additionally, according to some embodiments of the present invention, each device is adapted to communicate via both a cellular communication network and an internet network.

Moreover, according to some embodiments of the present invention, the method further includes providing position-dependent data to the roaming device responsive to the real time position data, thereby enabling a user of the device to perform a business transaction employing the position-dependent data. According to some embodiments of the present invention, the system browser enables communication via at least one of a global communication component and a local component.

According to some further embodiments of the present invention, the global communication component is GSM.

Additionally, according to some embodiments of the present invention, the local component is selected from the group consisting of; Bluetooth, WiFi, GPS and NFC.

According to some embodiments of the present invention, the real time position data includes a set of global positioning system (GPS) coordinates. According to some further embodiments of the present invention, the position-dependent data includes information relating to at least one commercial entity in the vicinity of the real time position.

According to some embodiments of the present invention, methods of payment may further includes detecting at least one of the roaming communication devices by a plurality of static communication devices, each adapted to communicate via at least one of the cellular communication network and the internet network.

Moreover, according to some embodiments of the present invention, each static communication device is placed at a predefined position.

According to some embodiments of the present invention, the method of payment further includes charging the user for the provision of the position-dependent data. According to some embodiments of the present invention, the method of payment further includes charging the at least one commercial entity for the provision of the position-dependent data. According to some additional embodiments of the present invention, the method of payment further includes charging the user for the provision of the information.

According to yet some further embodiments of the present invention, the method of payment further includes charging the at least one commercial entity for the provision of the information to the user.

The GLocal network system further comprises a multiplicity of GLocal Sites. These are adapted to facilitate transactions via the cell phone. The GLocal network system further allows for virtual enhancement of the physical confines of the business. In some cases this may enable a business owner to outsource his/her employee expenses to his/her customers. The GLocal network system further provides for an interactive club membership, enhances POS capabilities, passive advertising and allows for free communication with customers and/or employees. The GLocal network system further enables data mining and statistical analysis for targeted marketing and loyalty attainment.

The information which the Glocal networks produce may be used as a search engine, for finding information about events, which occur in the real world.

One or more embodiments of the present invention provide a user of a cellular device on the integrated communication system with a private database (Pdb). The private database may be formed by a user by collecting data relating to other cellular mobile devices and users thereof in his vicinity. These devices may not belong to registered users of the integrated communication system.

A registered user may be able to receive many valuable services from the integrated communication system without necessarily having any registered friends.

Any registered user on the integrated communication system will be able to use practically every social and market service to its full potential.

In certain embodiments of the present invention, improved methods and apparatus are provided for providing enhanced and versatile integrated communication systems.

The combined local and global network comprises a virtual network interleaving two communication media networks. The combined network is termed herein a "GLocal" network.

The GLocal network enables an individual or company to create their own GLocal site, for private or business use.

The GLocal network further comprises GLocal integrated communication modules (ICMs) distributed geographically at different points. The ICMs enable interactivity between Global and local devices equipped with appropriate communication modules. Typically, the ICMs are static.

There is thus provided according to an embodiment of the present invention an integrated communication system including;

a) a cellular communication network;

b) a global internet network;

c) a plurality of roaming communication devices adapted to communicate via both the cellular communication network and the internet network;

d) a plurality of locally distributed integrated communication modules (ICMs), each ICM placed at a predetermined position and each ICM including;

i) at least one global communication module;

ii) at least one local communication module; and iii) an interface for communication between the at least one global communication module and the at least one local communication module; wherein each ICM is adapted to detect a short-range position dependent signal from an approaching roaming communication device and to report real time position data of the communication device to at least one of the networks whereby the global internet network is operative to provide position-dependent data to the roaming device responsive to the real time position data.

According to some embodiments of the present invention, the at least one global communication module is adapted to communicate via a wireless wide area network (wWAN)

According to some embodiments of the present invention, the at least one local communication module is adapted to communicate via a wireless local area network (wLAN) connection.

According to some further embodiments of the present invention the predetermined position includes a set of global positioning system (GPS) coordinates.

According to some additional embodiments of the present invention, the predetermined position includes a set of local positioning system (LPS) coordinates.

Additionally, according to some embodiments of the present invention, each locally distributed communication unit includes at least one unique identifier.

Moreover, according to some embodiments of the present invention each roaming communication device includes a system browser.

According to some embodiments of the present invention, the system browser is adapted to enable communication via at least one of a global communication module and a local module.

Furthermore, according to some embodiments of the present invention the system browser is adapted to enable communication via a global communication module and a local module. Yet further, according to some embodiments of the present invention, the global communication module is GSM. According to some further embodiments of the present invention, the local module is selected from the group consisting of; Bluetooth, Wifi, GPS and NFC.

According to some embodiments of the present invention, the real time position data includes a set of global positioning system (GPS) coordinates.

Moreover, according to some embodiments of the present invention, an integrated communication system, wherein the real time position data includes a set of local positioning system (LPS) coordinates. According to some embodiments of the present invention, the position-dependent data includes information relating to at least one commercial entity in the vicinity of the real time position. According to some additional embodiments of the present invention, the position-dependent data includes information relating to at least one commercial entity in the vicinity of at least one communication ICM unit.

Additionally, according to some embodiments of the present invention, the information includes at least one of; product sales data, services sales data, geographic data, special offer data, image data, video data and audio data, electronic coupons electronic documents, electronic images; computer graphics; electronic mail, music and short message service data.

According to some further embodiments of the present invention, the integrated communication system further includes a plurality of static communication devices, each adapted to communicate via at least one of the cellular communication network and the internet network.

According to some embodiments of the present invention, each static communication device is placed at a predefined position.

According to some additional embodiments of the present invention, the predefined position is at one of a business and a home.

According to some embodiments of the present invention, the position-dependent data is further relayed to at least one static communication device.

According to some further embodiments of the present invention, at least one the locally distributed communication unit is configured to provide the position-dependent data to the at least one static communication unit.

Additionally, according to some embodiments of the present invention, the position dependent data is responsive to data of a user of the roaming device. According to some embodiments of the present invention, the position dependent data is responsive to a user of the static or roaming communication device. According to some embodiments of the present invention, the data of the user includes at least one of a name, an address, a geographic location; a date of birth, a nationality, a religion, a profession, an interest, a medical record, a bank record, a business record, a hobby, a blood type and a marital status of the user.

According to some additional embodiments of the present invention, each of the locally distributed communication units (ICMs) includes at least four modules selected from;

i) a wireless BT module;

ii) a Pic module;

iii) an optional wireless Wifi module;

iv) an optional wireless GSM module;

v) an ETH module; and vi) a USB module.

According to some embodiments of the present invention, each of the locally distributed communication units (ICMs) includes a UART interface, configured to be activated by an AT command.

GLocal Sites

A GLocal site is a site which represents a physical place in the real world.

A GLocal site allows the continuous flow of information from the real world to the virtual world.

The above fact enables a GLocal site the following abilities:

a. Full interaction between people in the physical world to a GLocal site and therebetween at a time when they are surfing a GLocal site (for example, M-tickets, M-commerce and M-forums, cell phone customer clubs, mobile prescription).

The GLocal network system comprises a number of features. These include, but are not limited to:

- Advanced Point of Sale ("POS") devices extended to the mobile
- Interactive mobile club membership
- Innovative electronic mobile tickets
- Interactive mobile maps
- Notifications for targeted marketing (active advertising)
- Returning customer identifiers
- Roaming (Debating) Customer
- Customers in groups or alone identifier
- Characteristics of customer base
- Advertising on GLocal Site
- Access nearby business's GLocal sites
- Proximity based mobile market place
- Dynamic variety of notifications and recommendations
- Track friends/family/the mobile agent (via Geographic "GEO" Feed)
- Receive Real Time Notifications The GLocal network system further comprises a multiplicity of GLocal Sites. These are adapted to facilitate transactions via the cell phone. The GLocal network system further allows for virtual enhancement of the physical confines of the business. In some cases this may enable a business owner to outsource his/her employee expenses to his/her customers. The GLocal network system further provides for an interactive club membership, enhances POS capabilities, passive advertising and allows for free communication with customers and/or employees.

The GLocal network system further enables data mining and statistical analysis for targeted marketing and loyalty attainment.

The information which the Glocal networks produce may be used as a search engine, for finding information about events, which occur in the real world. For example, context searching; if searching a "party"-results will be obtained regarding places in which many young people are gathering at the moment, etc.

The identification of the customer is displayed in real time at a point of sale of the business and the salesperson can fill in details regarding the user in real time or later. In this way, each business can form for itself a personal business database which comprises customers, who are not listed for a service and menus which the business itself introduced to these customers' profiles.

For Example—

On the point of sales' screen all the customers' profiles, who are in the store will appear in real time

- The system will automatically display for each profile the history of visits of each customer to the store, such as displaying if the customer is a regular customer, a long-term customer, a new customer, if the customer is a sporadic-visit customer etc.
- The salesperson/store manager can open each one of the profiles appearing on screen and/or within a listing in the database and read information about them, which was previously defined and/or uploaded regarding the customer by another/previous salesperson (real customer name, location of residence, previous purchase, details of today's purchase(s), type of outstanding purchase, any customer satisfaction details, any customer dissatisfaction details, and the like.
- The salesperson/store manager can open each one of the profiles and add new and updated information to the profile.
- The salesperson/store manager can request to send a message to the point of sales or to the cellular device of the salesperson/store manager to update him/her about the appearance of the customer in the store on in the proximity thereof.
- The salesperson/store manager can define a campaign and a system for sending messages to the customers, such as SMS, Bluetooth or others to the customers' cellular phones, on the basis of any parameter which was gathered in the computer system. These SMS or other messages may be, for example, but not limited to:
  - At every appearance in the store
  - At the hundredth visit to the store
  - At the hundredth purchase
  - At a specific purchase
  - At any other notable event
  - On another basis.

Further, one or more embodiment of the present invention to provide a method of performing a business transaction employing a versatile integrated communication system, which allows integration of local and global communications.

There is thus provided according to an embodiment of the present invention a method of performing a business transaction, the method including;

a) monitoring a plurality of roaming communication devices, each device adapted to communicate via both a cellular communication network and an internet network;

b) deploying a plurality of locally distributed integrated communication modules (ICMs), each ICM placed at a predetermined position and each unit including;

- at least one global communication module;
- at least one local communication module; and
- an interface for communication between the at least one global communication module and the at least one local communication module; and c) providing position-dependent data to the roaming device responsive to the real time position data, thereby enabling a user of the device to perform a business transaction employing the position-dependent data.

According to some embodiments of the present invention, the monitoring step further includes detecting a short-range position dependent signal from an approaching roaming communication device.

According to some further embodiments of the present invention, the monitoring step further includes reporting real time position data of the communication device to at least one of the networks.

Additionally, according to some embodiments of the present invention, the at least one global communication module communicates via a wireless wide area network (wWAN).

Furthermore, according to some embodiments of the present invention, the at least one local communication module communicates via a wireless local area network (wLAN) connection.

Moreover, according to some embodiments of the present invention, the predetermined position includes a set of global positioning system (GPS) coordinates.

Additionally, according to some embodiments of the present invention, the predetermined position includes a set of local positioning system (LPS) coordinates.

According to some embodiments of the present invention, each of the locally distributed communication module includes at least one unique identifier.

Further, according to some embodiments of the present invention, each roaming communication device includes a system browser.

Furthermore, according to some embodiments of the present invention, the monitoring step further includes detecting at least one of the roaming communication devices by a plurality of static communication devices, each adapted to communicate via at least one of the cellular communication network and the internet network.

Typically, each static communication device is placed at a predefined position. Moreover, according to some embodiments of the present invention, the method of performing a business transaction further includes charging the user for the provision of the position-dependent data. Additionally, the method may further include charging the at least one commercial entity for the provision of the position-dependent data.

Typically, the method of performing a business transaction may further including charging the at least one commercial entity for the provision of the information to the user. Additionally, the method of performing a business transaction may further include charging the user for the provision of the information. The methods and systems of the present invention are adapted to perform optimized geographic data mining, thereby providing advanced business intelligence.

The combined local and global network comprises a virtual network interleaving two communication media networks. The combined network is termed herein a "GLocal" network. The GLocal network is adapted to store processed geographic data on a GLocal server. The GLocal network enables an individual or company to create their own GLocal site, for private or business use.

The GLocal network further comprises GLocal integrated communication modules (ICMs) distributed geographically at different points. The ICMs enable interactivity between Global and local devices equipped with appropriate communication modules. Typically, the ICMs are static. In additional embodiments of the present invention, mobile devices are provided with a communication module which enables them to identify nearby GLocal sites using a local network and to interact with the site using the local medium and further to interact with their surroundings via a global network. GLocal sites enable real-time transfer of information between a physical place and a virtual site and vice versa.

The communication module may be a tailored communication module, an ICM. This communication module is constructed and configured to constantly collect information about its surroundings using a local network and to store such data at an appropriate location on a global network, such as on the web. Users and business can use Nsof InSite modules on the web to enhance their social, market and business insight, as will be described in further details hereinbelow.

The GLocal network system further collects data relating to the immediate surroundings of the device, suitable for analysis by the device user for his/her further decision on whether to store the data, use the data or pass on the data.

The system is adapted to collects data on all the business clients or customers, including unregistered users of the GLocal network. The GLocal network system further provides services and products to cellular and other roaming devices. The GLocal network system is further constructed and configured to provide a link between global and local communication devices. This further comprises a collecting/scanning agent for collecting information in the "physical" world.

Another aspect of the present invention comprises providing a direct interface to the GLocal community/network. The GLocal network system is further adapted to provide internet websites. These websites reflect all compiled activity scanned by one or more mobile clients. The GLocal network system further extends a user's physical world into a virtual mine of information.

The GLocal network system is constructed and configured to displays advanced statistics and to provide traditional social network functionalities.

The GLocal network system further comprises a plurality of Servers. These servers manage the flow of data/information in the network. They are further constructed and configured to perform real time synchronization between a mobile client and an Internet website. These servers are further constructed and configured to perform advanced data mining, suitable for at least one of personal use and commercial use.

The GLocal network system is further constructed and configured to enable E-Commerce features, such as transactions via a mobile client.

According to one embodiment of the present invention, the GLocal network system comprises a multiplicity of Bluetooth nodes, or ICMs, which are static agents, disposed in restaurants, stores and community gathering places.

The GLocal network system further provides for interactive functionality for customers, who are proximal to your business.

In additional embodiments of the present invention, there is provided a unique social and M-Commerce platform powered by integrating the mobile's capabilities into a combined local and global network.

The GLocal systems of the present invention allow for specialized and uniquely designed business intelligence. The systems provide for many different market analyses, such as, but not limited to:

Detecting the connection between an existing club membership card of a club member with his/her cellular device or phone by use of detecting the Bluetooth of the device. By use of cross-correlation and mathematical and/or statistical probability determination of a position of a cell phone by its Bluetooth, coupled with knowledge of the model of the cell phone, the operators and the name of the Bluetooth, the cell phone user's club membership can be cross-correlated with the phone's position and movement. This information can be used to track the user and to provide purchase offers responsive to his/her current position and/or financial status and/or purchasing history.

Cellular Membership Card and payments via the Cellphone device. The GLocal system of the present invention allow for installation of interface applications directly to the purchasing club membership, which can be activated directly from the members'/users' phone devices. Again, the methods of payment and payment terms may be personally tailored responsive to his/her current position and/or financial status and/or purchasing history.

Enrichment of customer (user) information using correlation of open content (such as internet). This can be performed by determining the unique names of the Bluetooth and finding the suitable characteristics in the profiles and in social networks. For example, if the name of the Bluetooth is detected in a certain membership club and in a given social network the same member's name appears in the group associated with that club, the value of the fit will be increased. Whenever the value of the fit is above a required threshold, the information may be used to enrich the information about that member/customer/user for the club membership and/or may further be used to update the data.

Extraction of Geographic Information of a Store. A store owner can receive data from the GLocal server concerning the popular routes taken within a store, the popular areas and shelves, the checkouts in which there is a bottleneck or long queue (line), average residence time of customers in the store.

Segmentation of the Clients in the Store/Business premises (without an application). These may include permanent customers, customers who by chance or randomly are in the vicinity of the store, "passers-by" who window shop or just happen to be passing by the store.

Segmentation of Customers in the business (without an application) with cross-correlation to club card members. One can cross-correlate to find wasteful customers, the type of purchases made by the customer and trends of the customers' purchases.

Segmentation of Customers in the business (with an application) with cross-correlation to club card members. One can cross-correlate to find wasteful customers, the type of purchases made by the customer and trends of the customers' purchases.

Segmentation of Customers between a number of businesses. Different businesses can coordinate and share their customer data and trends. This may enable these businesses to identify overlapping groups between different segments of different businesses.

Definition of Customers at the level of a chain (of stores, for example). One can characterize the clients on the basis of the businesses which are found in a chain and one can classify the customers at the level of the chain. For example, customers who hang out or spend a lot of time at coffee shops (part of a coffee shop chain), customers who spend many hours at camping equipment stores (part of a camping equipment stores chain) and the like.

Focused and Smart Direct Mail in accordance with geographic characteristics, purchasing history and personal history. The GLocal system can be used to provide cell phone users with focused and smart direct mail in accordance with geographic characteristics, purchasing history and personal history. For example, a teenager may be provided with mail concerning local rock concerts and shows. A pensioner may be provided with information concerning easy access museums or "golden oldies concerts". It should be understood that the mail may be electronic and/or on paper.

There is thus provided according to an embodiment of the present invention an integrated communication system including;

a) a cellular communication network;

b) a global internet network;

c) a plurality of roaming communication devices adapted to communicate via both the cellular communication network and the internet network;

d) a plurality of locally distributed integrated communication modules (ICMs), each ICM placed at a predetermined position and each ICM including;

i) at least one global communication module;

ii) at least one local communication module; and iii) an interface for communication between the at least one global communication module and the at least one local communication module; wherein each ICM is adapted to detect a short-range position dependent signal from an approaching roaming communication device and to report real time position data of the communication device to at least one of the networks whereby the global internet network is operative to provide position-dependent data to the roaming device responsive to the real time position data.

According to some embodiments of the present invention, the at least one global communication module is adapted to communicate via a wireless wide area network (wWAN). According to some embodiments of the present invention, the at least one local communication module is adapted to communicate via a wireless local area network (wLAN) connection. According to some further embodiments of the present invention the predetermined position includes a set of global positioning system (GPS) coordinates. According to some additional embodiments of the present invention, the predetermined position includes a set of local positioning system (LPS) coordinates.

Additionally, according to some embodiments of the present invention, each locally distributed communication unit includes at least one unique identifier. Moreover, according to some embodiments of the present invention each roaming communication device includes a system browser.

According to some embodiments of the present invention, the system browser is adapted to enable communication via at least one of a global communication module and a local module. Furthermore, according to some embodiments of the present invention the system browser is adapted to enable communication via a global communication module and a local module. Yet further, according to some embodiments of the present invention, the global communication module is GSM.

According to some further embodiments of the present invention, the local module is selected from the group consisting of; Bluetooth, Wifi, GPS and NFC.

According to some embodiments of the present invention, the real time position data includes a set of global positioning system (GPS) coordinates.

Moreover, according to some embodiments of the present invention, an integrated communication system, wherein the real time position data includes a set of local positioning system (LPS) coordinates.

According to some embodiments of the present invention, the position-dependent data includes information relating to at least one commercial entity in the vicinity of the real time position.

According to some additional embodiments of the present invention, the position-dependent data includes information relating to at least one commercial entity in the vicinity of at least one communication ICM unit.

Additionally, according to some embodiments of the present invention, the information includes at least one of; product sales data, services sales data, geographic data, special offer data, image data, video data and audio data, electronic coupons electronic documents, electronic images; computer graphics; electronic mail, music and short message service data.

According to some further embodiments of the present invention, the integrated communication system further includes a plurality of static communication devices, each adapted to communicate via at least one of the cellular communication network and the internet network.

According to some embodiments of the present invention, each static communication device is placed at a predefined position. According to some additional embodiments of the present invention, the predefined position is at one of a business and a home. According to some embodiments of the present invention, the position-dependent data is further relayed to at least one static communication device.

According to some further embodiments of the present invention, at least one the locally distributed communication unit is configured to provide the position-dependent data to the at least one static communication unit. Additionally, according to some embodiments of the present invention, the position dependent data is responsive to data of a user of the roaming device. According to some embodiments of the present invention, the position dependent data is responsive to a user of the static or roaming communication device.

According to some embodiments of the present invention, the data of the user includes at least one of a name, an address, a geographic location; a date of birth, a nationality, a religion, a profession, an interest, a medical record, a bank record, a business record, a hobby, a blood type and a marital status of the user.

One or more embodiments of the present invention will be more fully understood from the following detailed description of the preferred embodiments thereof, taken together with the drawings.

BRIEF DESCRIPTION OF THE DRAWINGS

One or more embodiments of the invention will now be described in connection with certain preferred embodiments with reference to the following illustrative figures so that it may be more fully understood.

In the drawings.

In all the figures similar reference numerals identify similar parts

DETAILED DESCRIPTION OF THE INVENTION

In the detailed description, numerous specific details are set forth in order to provide a thorough understanding of the invention. However, it will be understood by those skilled in the art that these are specific embodiments and that the present invention may be practiced also in different ways that embody the characterizing features of the invention as described and claimed herein.

Figure 1A:
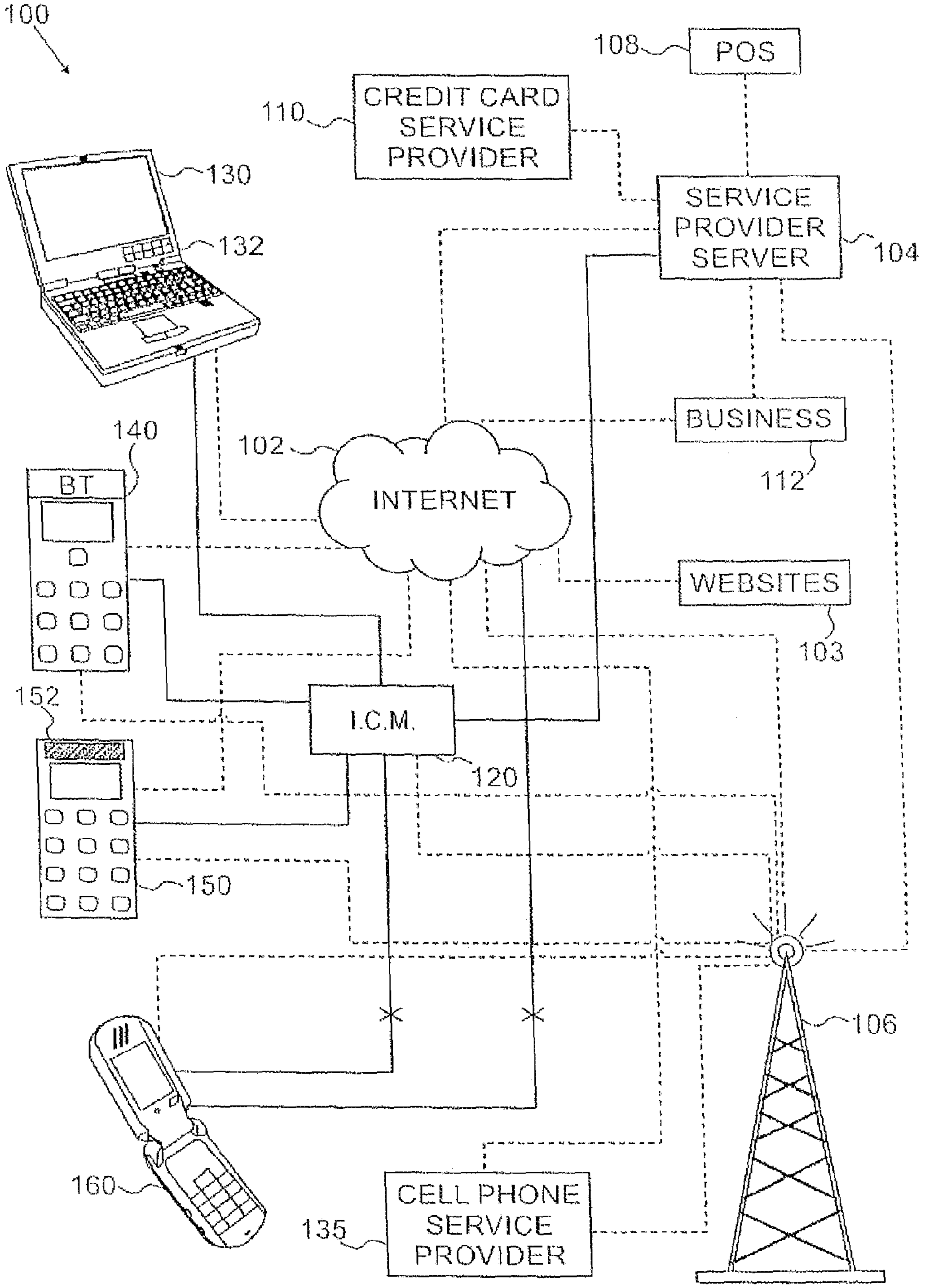
FIG. 1A is a simplified pictorial illustration showing a GLocal network system for advanced communication, in accordance with an embodiment of the present invention.

Reference is now made to FIG. 1A, which is a simplified pictorial illustration of a GLocal network system 100 for advanced communication, in accordance with an embodiment of the present invention.

System 100 comprises at least one global network, such as, but not limited to, the internet 102 and a service provider server, termed herein a GLocal server 104. Further details of server 104 appear in FIG. 3 hereinbelow.

A number of user devices 130, 140, 150 and 160 can communicate with the internet via one or more antennae 106, in some cases via satellite (not shown) by methods known in the art.

The user devices may be static or roaming devices. Additionally system 100 comprises a number of static integrated communication modules (ICMs) 120, each placed at a known location. Further details of the ICMs are provided in FIG. 2 hereinbelow.

Some of the devices, for example device 160, which is an old first/second generation cell phone, has no internet functions and does not comprise any local network features, such as GPS. Device 160 cannot therefore communicate with internet 102 or with ICM 120.

Other devices, such as cellular phone device 150 and laptop computer 130, each comprise a GLocal browser 152, 132 respectively and can be detected by ICM 120. Additional devices 140 may lack a GLocal browser but have other local network features, such as GPS, and can be detected when in the vicinity of ICM 120 by the ICM.

Devices 130, 140, 150 160 may be any communication device such as personal digital assistants, portable computers, cellular phones or any other integrated communication devices known in the art.

It should be understood that many variations to this system are envisaged, and this embodiment should not be construed as limiting. For example, a facsimile system or a phone device (wired telephone or mobile phone) may be designed to be connectable to a computer network (e.g. the Internet). Interactive televisions may be used for inputting and receiving data from the Internet.

System 100 includes the service provider server 104, which may include one or a plurality of servers and one or more control computer terminals (not shown) for programming, trouble-shooting servicing and other functions. Server 104 is linked to the Internet 102. There may be one or more websites 103 associated with system 100 and for communication with the users. Users may communicate with the server through a plurality of user devices 130, 140, 150, or by wired phones and computers (not shown) with terminals that permit individual to access a network, personal computers, portable computers, small hand-held computers and other, that are linked to the Internet 102 by links known in the art.

The Internet link of each of devices 130, 140, 150 may be direct a wireless line, or may be indirect, for example through an intranet (not shown) that is linked through an appropriate server to the Internet.

Devices 130, 140, 150, and 160 may be in communication with one or more cell phone service providers 135. The cell phone service provider may receive indications of the locations of the devices via one or more antennae 106.

The intelligent network mobile operator site is constructed and configured to communicate via antenna 170 with at least one intelligent network fixed operator site 114, via a switch 116 associated therewith.

Also, it should be noted that the invention is not limited to the user-associated communication devices—computers and portable and mobile communication devices—and a variety of others such as an interactive television system may also be used. The system also typically includes at least one call and/or user support center 190 (not shown).

ICM 120 may be as described in FIG. 2 hereinbelow. The ICM has a range for detecting devices 130, 140 and 150. Some ICMs may be configured to detect devices over a long range (1-50 km), others may be configured to detect devices within a short range 0-5 km. Yet others may be configured to be operative within a near range 0-1 km or very near range 0-100 m. The ICM may use any one or more of the following local media Bluetooth, Wifi, GPS, and NFC, or any other local media known in the art. The ICM may further be equipped with at least one global medium, such as, but not limited to, internet & cellular communication media.

Service provider server is further in communication with one or more point of sales 108, which are described in further detail hereinbelow.

Additionally, the service provider server is in communication with one or more credit card service providers 110.

System 100 is adapted to be used by businesses or homes 180, 182, 184 at one locality 170. Each business has a specific GLocal ICM 120, 121, 122 associated therewith. Alternatively, there may be a number of homes/businesses associated with one GLocal ICM 120. Additionally, each business has at least one computer or other device 181, 183, 185 respectively, associated with the business. The GLocal ICM can detect a device, such as device 150, when the device comes within a detection range of the ICM. The ICM then transmits a signal indicative of the location of device 150 via internet 102 to the service provider server. Additionally or alternatively, the ICM transmits a signal indicative of the location of device 150 to a local manager 195. Service provider server 104 updates a service provider website 189. Service provider website 189 updates one or more personal sites 186, 187, 188 (termed herein GLocal sites). At least one of these personal sites may be associated with device 150 or the user thereof.

Figure 2:
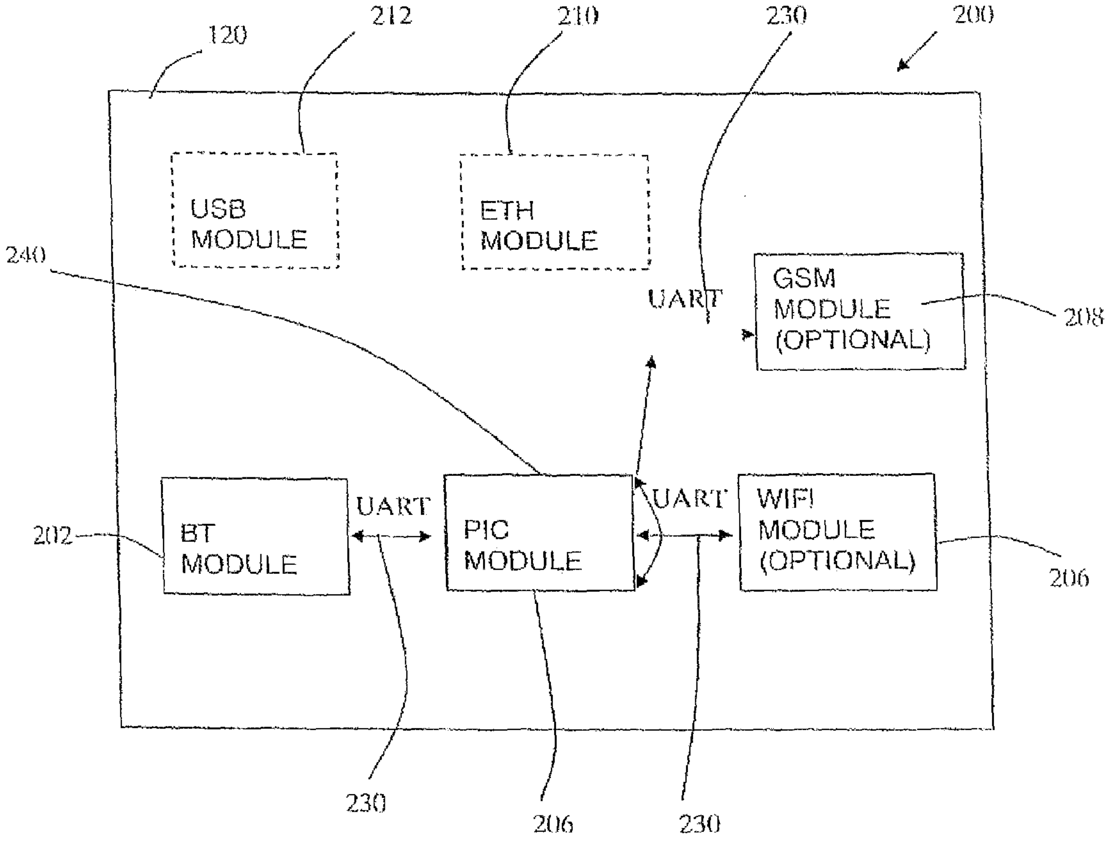
FIG. 2 is a simplified pictorial illustration of a GLocal ICM in accordance with an embodiment of the present invention.

Reference is now made to FIG. 2, which is a simplified pictorial illustration of GLocal ICM 200 in accordance with an embodiment of the present invention.

Figure 1B:
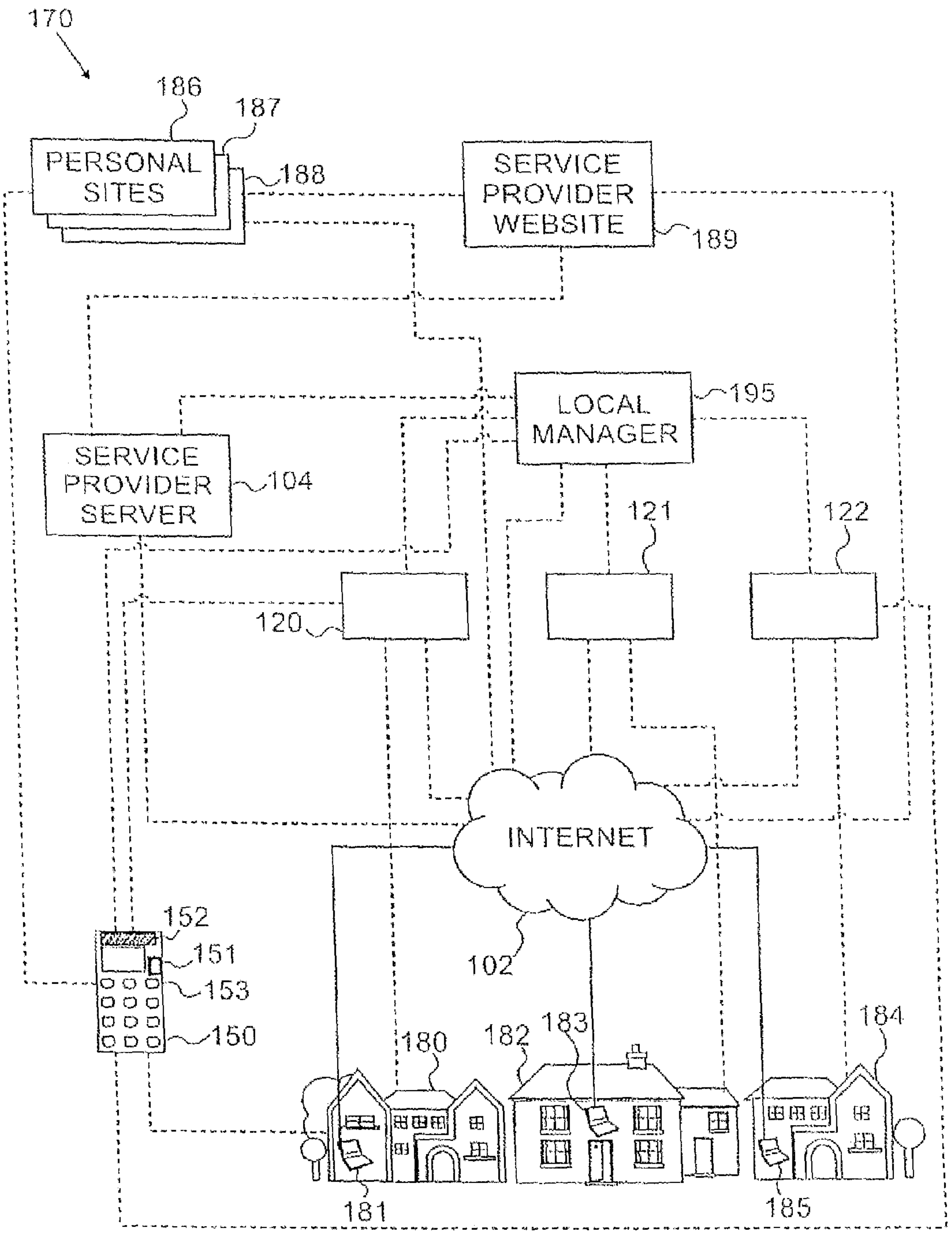
FIG. 1B is a simplified pictorial illustration showing further details of features of the GLocal network system of FIG. 1A.

GLocal ICMs 200 are distributed at recreational, commercial and industrial locations. Every business can install its own GLocal ICM 200, as is seen in FIG. 1B. The business can further purchase or lease software and applications suitable for using the ICM and GLocal system.

A GLocal ICM 200 typically comprises at least four modules:

a) a wireless BT module 202;

b) a Pic module 204;

c) an optional wireless Wifi module 206;

d) an optional wireless GSM module 208;

e) an ETH module 210; and f) a USB module 212.

GLocal ICMs 200 are standalone devices which have purpose-designed integration of global communication module(s) for cellular and/or internet communications, together with local communication modules, such as Bluetooth, Wifi, GPS, NFC.

The units which supply the module with an interface of the UART type can be activated by an AT command.

The WiFi and/or GSM units may be, according to some embodiments, detachable. Additional features, suitable for the second generation of the GLocal ICMs are ETH module 210 and USB module 212.

The Pic module can switch from being connected to the GSM module to the WiFi module, and vice versa.

Additionally, GLocal ICMs 200 are constructed and configured to report any BT device which is detected in its surroundings. The GLocal ICMs 200 can report the device number or identity and the strength of detection thereof to remote server 104 and/or to a local manager server 195.

GLocal ICMs 200 may be built as cards comprising the aforesaid modules, which can be purchased, or may comprise designed chips which achieve the same effect at a lower price. The ICM reports all information received by the GSM and/or Wifi module to the BT module and vice versa.

GLocal ICMs 200 comprise logic hardware, analog hardware, broadcasting modules 206, 208, 202 and one or more standard UART interfaces 230.

The PIC module may comprise a PIC 32 bit processor 240, for example. The Pic module allows communication between all the modules in GLocal ICMs 200.

The Glocal system 100 is configured and constructed to enable at least one of the following interactions with other products:

Retail VIP club member (essential)

Search engine on the web (essential)

Electronic Advertising systems—Coupon's and discounts (optional)

Mobile payment (optional)

Mobile advertising technologies (optional)

Point of sales terminals (optional)

Information Kiosks (optional)

Digital touch menus (optional)

Figure 3:
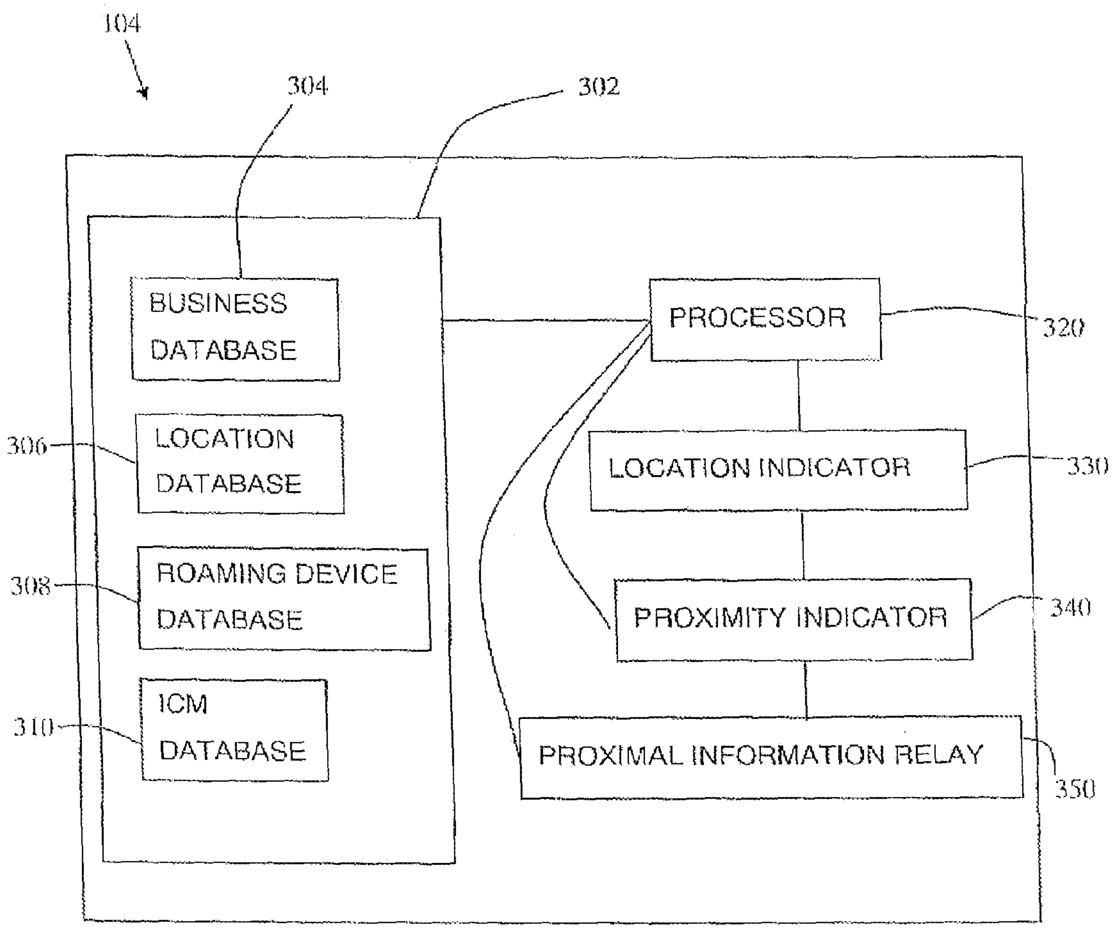
FIG. 3 is a simplified pictorial illustration of a GLocal server configuration, in accordance with an embodiment of the present invention.

Reference is now made to FIG. 3 is a simplified pictorial illustration of a GLocal server configuration 104, in accordance with an embodiment of the present invention. It should be understood that many variations to the structure of the server are possible and are deemed to be within the scope of the present invention.

The GLocal server comprises a memory 302. The memory contains a number of databases. For example, there is a business database 304 of all the businesses registered at service provider website 189. Additionally, there is a location database 306 which comprises detailed maps of homes and business and distances therebetween.

A roaming device database stores data relating to all roaming devices registered/unregistered but detectable at one or more locations 170.

There is a ICM database 310 of Glocal ICMs. Server 104 comprises one or more processors 320, a location indicator 330, a proximity calculator 340 and a proximal information relay 350.

Figure 4:
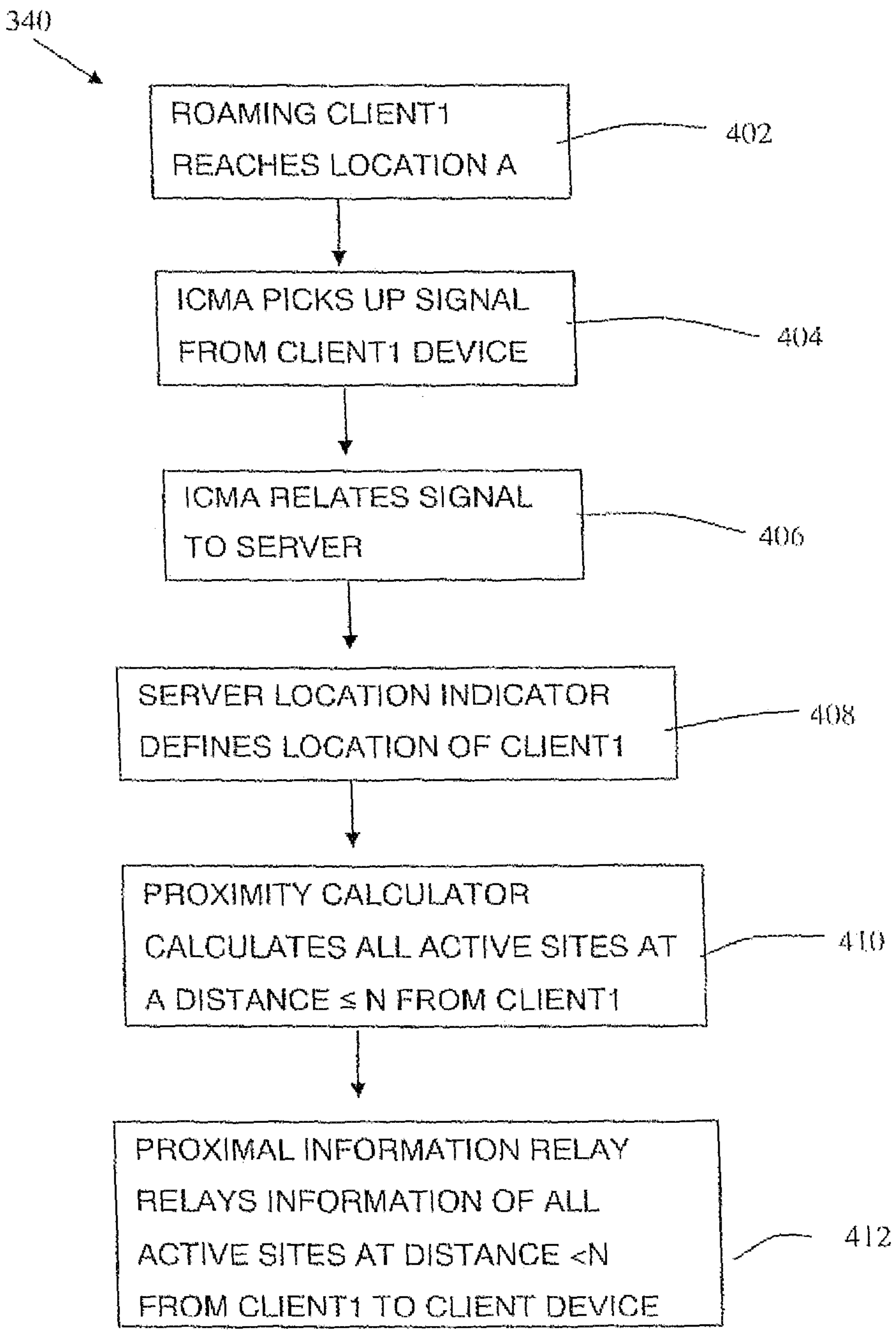
FIG. 4 is a simplified flow chart of a method for providing GLocal site data to a roaming client device, in accordance with an embodiment of the present invention.
Figure 5:
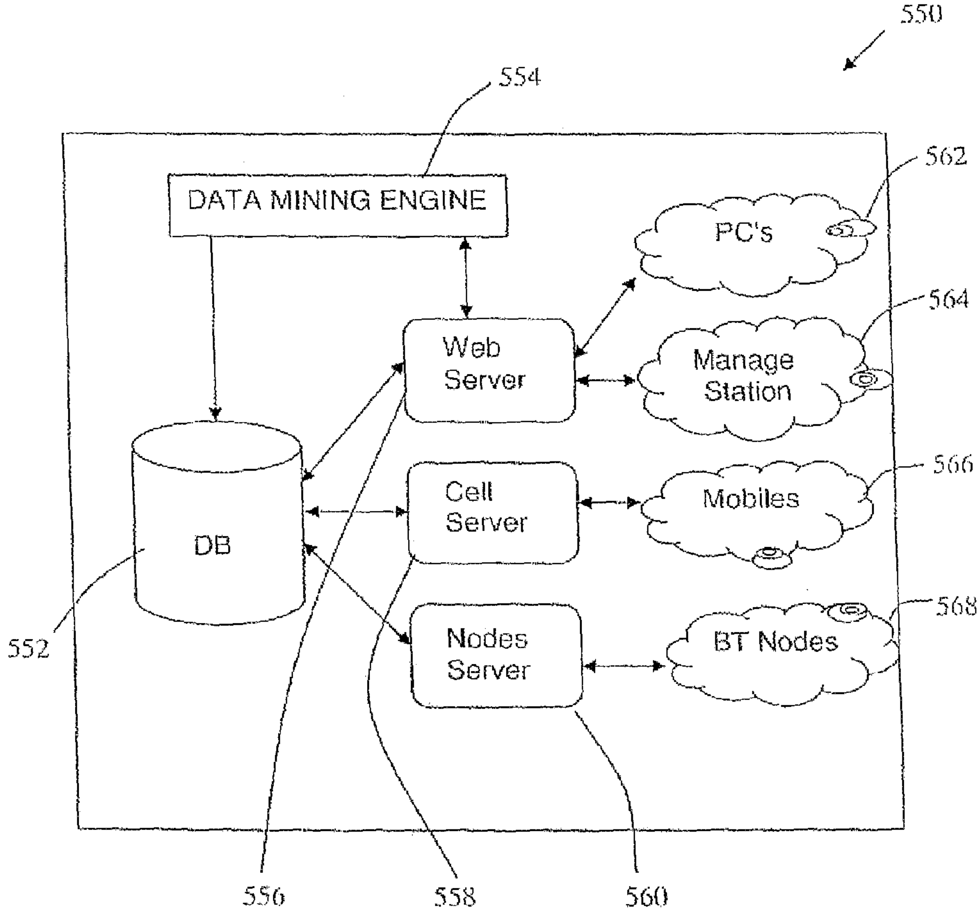
FIG. 5 is a simplified pictorial illustration of a data mining system of the GLocal network system of FIG. 1A.

Reference is now made to FIG. 4, which is a simplified flow chart 400 for providing GLocal site data to a roaming client device, in accordance with an embodiment of the present invention.

In a roaming step 402, a roaming client carrying device 150 reaches location 170 (FIG. 1A).

In a detecting signal step 404, ICM 120, associated with business 180 picks up a signal from device 150.

In a relaying step 406, ICM 120 relays at least one signal via internet 102 to service provider server 104.

Processor 320 may check one or more databases in memory 302 to determine the details of the user/business/device. For example, processor 320 may obtain data regarding the device from roaming device database 308, as well as data regarding the location of ICM 120. The location indicator can compare data relating to ICM 120 and details of the proximity and intensity of signal from device 150, picked up by ICM 120. In some cases, signals from one device may be picked up by more than one ICM in step 404. For example device 150 may be detected by both ICMs 120 and 121.

In a locating step 408, location indicator 330 maps the distance of device 150 from ICM 120, and possibly also from ICM 121, thereby defining Cartesian coordinates of device 150 at a particular time.

In a proximity calculation step 410, the location indicator passes the data regarding the location of device 150 at a particular time to proximity calculator 340. The proximity calculator may retrieve data from databases 304, 306, 308, 310. It thus determines the nearest businesses to device 150. The proximity calculator can thus retrieve sites 187 and 188 associated with business 180 and 182 respectively.

It should be understood that the steps of flow chart 400 may be repeated at various time intervals for each device. Thus the device user will receive updates relative to his current location in real time form server 104 and from sites 186, 187 and 188. Likewise, businesses 180, 182 and 184 receive real-time updates regarding devices in or near to them.

In an information relay step 412, the proximal information relay relays and uploads sites 187 and 188 on device 150. This provides for enhanced functionality of a device user in proximity with the associated business locations 180, 182. Additionally, businesses 180, 182 may receive a notification that device 150 is moving towards them. Business 182 may then send a special offer email/SMS to device 150. Additionally or alternatively, site 187 may "pop-up" on an internet application on device 150 and provide the special offer.

The GLocal network system 100 of the present invention enables an increase in the volume of communications relative to either a standard global network system or a standard local network system. This is due to system 100 using optimization protocols to minimize costs and routes of communications therein. The optimization protocols may include critical pathway analysis and/or other known optimization protocols known in the art.

The GLocal devices enable maximal utilization of the communication network bandwidth by using the bandwidth of local components located on devices which are proximal to the user's device. For example, a user can upload a file, such as an image from the cellular device to an internet server.

Furthermore, the GLocal network enables communications of two or more users by a short or shortest path, having information of their relative locations, rather than flowing all the way to a central server and back again, the information can be passed using local components.

Additionally, GLocal networks enable proximal users to take advantage of the hardware of another proximal user. Thus one user without GPS can use the GPS installed on a proximal device.

For example in a business to client communication, local manager 195 may receive real-time information about a location of device 150 from service provider server 104. Thereafter, data transfer from business 180 may be rerouted. Rather than the data going via the internet to the service provider server and from the service provider server either directly to device 150 or via local manager 195 to the device, the data may be provided via one of the following routes (see FIG. 1B):

a) from device 181 directly to device 150;

b) from device 181 via ICM 120 to device 150;

c) from device 181 via ICM 120 to local manager 195 to device 150;

d) from device 181 via ICM 120 to internet 102 to local manager 195 to device 150;

In a business to business communication (FIG. 1B) from device 181 to device 183, communications could be sent via ICM 120 to internet 102 to service provider server 104 to local manager 195 to ICM 121 and lastly to device 183.

Website data could flow as follows in a business to business communication (FIG. 1B), from device 181 to device 183, communications could be sent via ICM 120 to internet 102 to service provider server 104 service provider website 189 to personal website 186 back to internet 102 and to service provider server 104 onto local manager 195 directly to device 183 or via ICM 121 to device 183.

Thus, it can be seen that in system 100 there are numerous routes of communications possible, some of which pass through many intermediates.

One of the major objects of the present invention is to provide shortcut routes of communications, preferably via shortest and most local routes possible, which save on communication time and costs.

Thus optimized business to business communication (FIG. 1B) from device 181 to device 183 could follow any of the following routes, depending on the size and type of data to be transferred:

a) directly from device 181 to device 183, assuming that each device has a GLocal browser 152 and that the devices are within a detectable distance one from the other;

b) from device 181 via ICM 120 to device 183;

c) from device 181 via ICM 120 to ICM 121 to device 183;

d) from device 181 via ICM 120 to local manager 195 to ICM 121 and on to device 183;

e) from device 181 via ICM 120 to internet 102 to local manager 195 to device 183.

A device user may register for services provided by the Glocal system 100 via website 189 at service provider server 104. This may require providing personal details, device details, credit card details and a subscription or fee, as is known in the art.

Any device user, who has registered at service provider server 104 via website 189 may be provided with real-time data regarding some/all mobile and/or static devices in his vicinity.

It should be understood that server 104 is constructed and configured to manages, control and operate the flow of data in system 100 using advanced algorithms. Server 104 is further constructed and configured to enable cellular, web and transactional activities, to allow advanced data mining in system 100, as well as to extract unique social, market and geographic statistics.

Server 104 is further constructed and configured to enable advanced social & marketplace features, to synchronize cellular and website activities, to optimize database management, and to define location of bluetooth ICMs/nodes (static agents) within system 100.

Server 104 is further constructed and configured to increase the accuracy of geographic and behaviorist data regarding unregistered users for registered users of the GLocal system. Server 104 is further constructed and configured to increase the leverage off of all Bluetooth devices including unregistered users. Server 104 is further constructed and configured to receive and analyze data according to the transmission of local communication devices in the proximity of the user, taking into consideration social-geographical data, and social connections between the user and his friends. The data gathered will give the user exact info and stats, on his life manners.

Server 104 is further constructed and configured to provide real time alerts regarding client/user traffic, line traffic, number of Employees on site in a business environment, employee arrival and exit at a location, remote selection control, track and optimize the efficiency of the POS—points of sale (transactions).

Figure 6A:
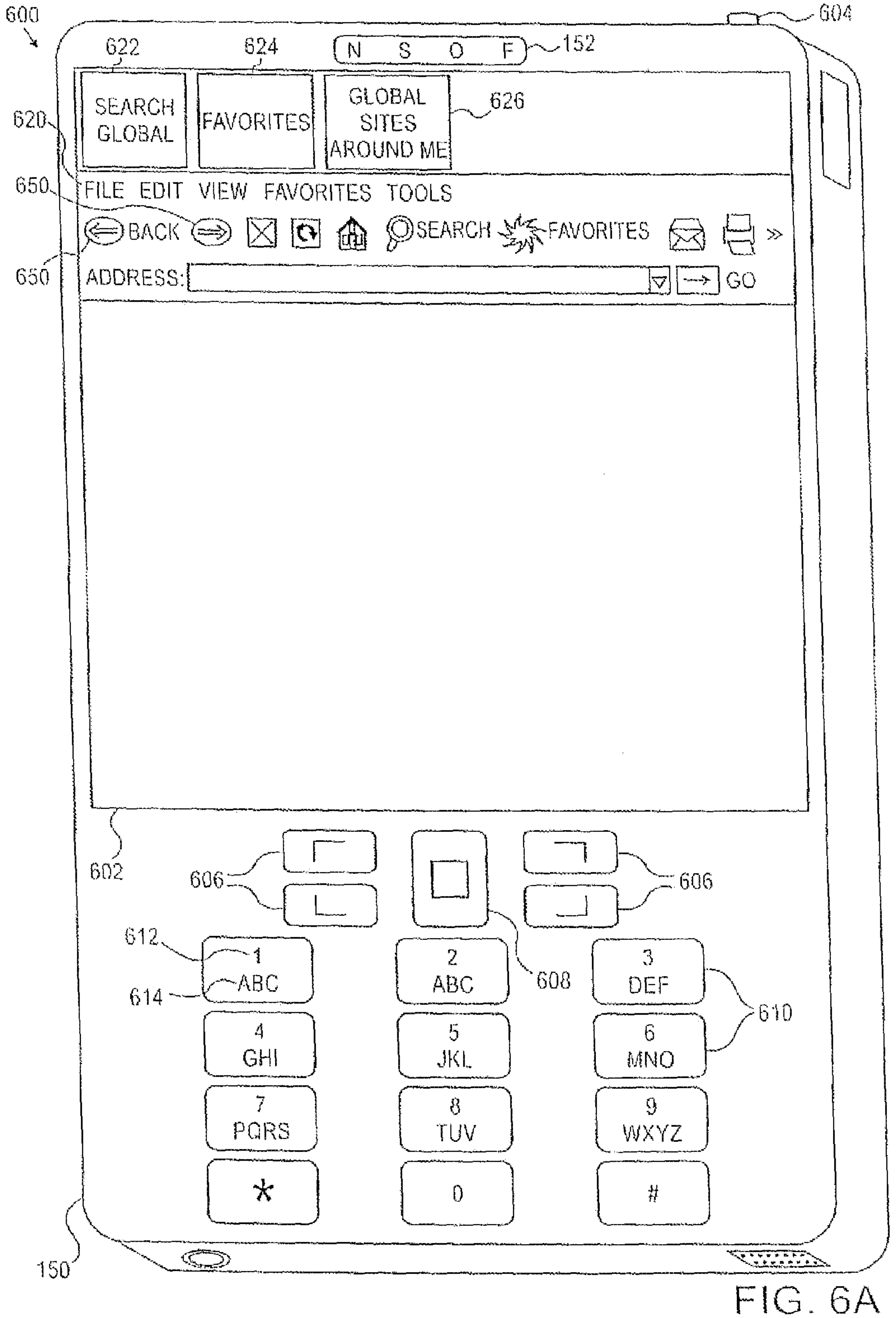
FIG. 6A is a simplified pictorial illustration of a GLocal communication device, in accordance with an embodiment of the present invention.
Figure 6B:
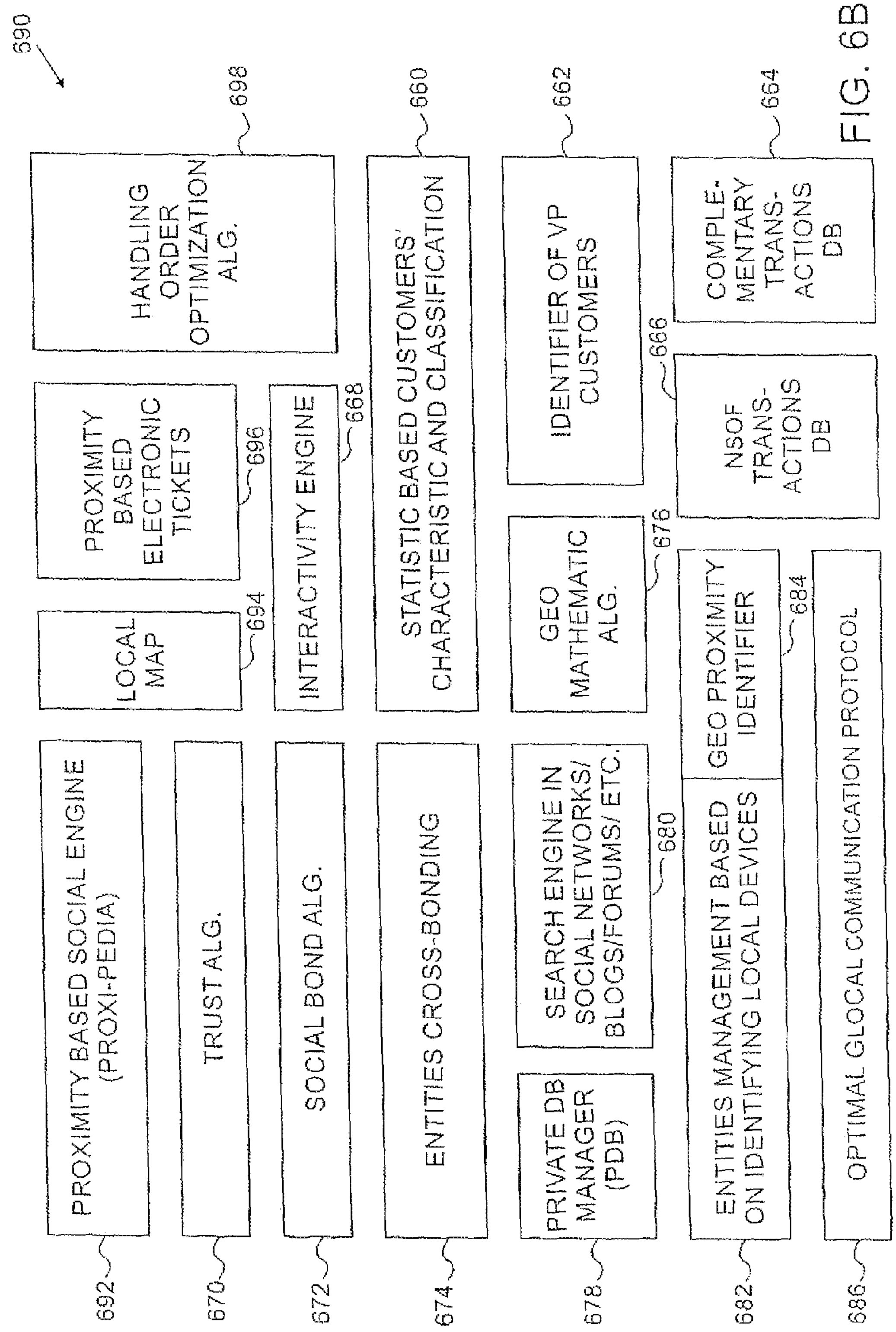
FIG. 6B is a simplified pictorial illustration of a block diagram of data mining advanced features of the system of FIG. 1A, in accordance with an embodiment of the present invention.

GLocal system 100 is configured and constructed to provide a default customer services package, allowing registered users at least some of the following services:

guiding online services (special treatment, provide shopping assistance, offer club/vip membership, electronic coupons) by identifying: returning customers, customers from other branches, competitor's customers (Market data), roaming (debating) customer, people from the "area"—nearby shops/homes (Geo data), spenders (through transaction history), vip clients Reference is now made to FIG. 6B, which is a simplified pictorial illustration of a block diagram 690 of data mining advanced features of system 100 of FIG. 1A, in accordance with an embodiment of the present invention.

The advanced features include a proximity-based social engine (proxipedia) 692, a trust algorithm 670, a social bond algorithm 672, an entities cross-bonding algorithm 676, a private database manager 678, a social search engine 680, an entities manager, based on identifying local devices 682, a geo-proximity identifier 684 and an optimal GLocal communication protocol 686.

The advanced features further comprise at least one local map 694, proximity-based local tickets 696, an order-handling optimization algorithm 698, and interactivity engine 668, a statistic based customers' characteristics and classification engine 660, an identifier of VIP customers 662, an Nsof transactions database 666 and a complementary transactions database 664.

The combined local and global network comprises a virtual network interleaving two communication media networks. The combined network is termed herein a "GLocal" network. The GLocal network is adapted to store processed geographic data on a GLocal server, such as server 104 (FIG. 1A).

Data mining and advanced features may include at least one of:

Characteristic and classification of customers
Geo and virtual data mining
Local Map applications as Alternative to GPS abilities
Mathematic Geo positioning
Private DB & Proximity based social engine
Electronic secured mobile tickets
Handling orders optimizations The Engine Builds rearrange & index the database in such way that in future time it will be able to handle requests for raw data and statistics analysis in real time.

The data mining business intelligence data may include social and/or business data pertaining to customers. The customers may be classified according to frequency of visits, loyalty, budget, expenditure, payment behavior, mobility, travel distance, time and frequency, social identity, behavior in a group, belonging to different groups and the like.

Social and Business trends according to device type—the protocol address, such as IMEI, will enable analysis of behavior and the exact model of the device. Market analysis of this type can be used by the cell phone companies to market their cell phone models more successfully.

Identification of users by cross-matching of data from, internet forums, social networks, blogs, talk-backs and the like, thereby determining characteristics such as age, gender, friends and hobbies of a user.

Real-time identification of favorite/preferred customers (VIP). The system can provide recommendations for identifying VIP customers in real time according to the VIP customer behavior trends, such as number of visits to a real or virtual site, quantity of money spent, etc.

Clever construction of registered and unregistered users' database. The database can include client reliability data, long-term behavior, places visited, social trends of users etc. Introduction of non-registered users to the database may be performed after receiving grades or marks from registered users, thereby building reliability profiles of the unregistered users.

Extraction of information from the real world for virtual search engines. Automatic and manual searching of geographic information to identify events in the real world and to send them to a search engine. For example, if several users attend a disco and one of the users took pictures or a video of the D.J., then key words, such as "disco" and "D.J." may be used in google or another search engine, which will link to the GLocal site and upload the images or video.

Reference is now made to FIG. 10A, which is a simplified pictorial illustration of communication layers 1000 of device 500 of FIG. 6A, in accordance with an embodiment of the present invention.

The communication layers generates communication requests by a mobile client and translates the request data into a language, such as, but not limited to JSON (Java script object notation). In a first handling step 1002, returned data is handled. In a translating step 1004, the JSON object is translated according to the mobile data types. In a decompression step 1006, a server response is decompressed. In a sending step 1008, the decompressed response is sent to a server and then the server response is awaited.

In a signing step 1010, the data is signed and made secret. Thereafter, the signed data is compressed in a compression step 1012.

Thereafter, the compressed data is translated into JSON in a second translation step 1014 and finally the mobile client generates a communication request, in a communications request step 1016.

As was illustrated in FIG. 1A, there are at least four types of devices in system 100:

a) Mobile devices such as device 160, which have no Bluetooth communication features and are not discoverable by ICM 120;

b) mobile devices such as device 140, which has Bluetooth communication features, but does not comprise a GLocal browser 152;

c) mobile devices such as device 150, which comprises a GLocal browser 152.

d) Static devices (ICMs) 120.

Reference is now made to FIG. 10B, which is a simplified table of resolution requirements of position determination in the system of FIG. 1A, in accordance with an embodiment of the present invention.

FIG. 10B describes various applications 1022, the required outcome of the application 1024 and the mathematical requirement for definition resolution 1026.

It is assumed that data from devices of groups a-c hereinabove (and not from group d) accumulate position data of other devices. An increase in the number of proximal devices of types a-c enables more accurate position data relating to a roaming device.

For example, in order to get a waiter to come to a table, the required resolution is calculated to be 5×5.

In order to track the pathway of a device in a large place, the required resolution is Boolean, whereas to identify focused advertising in a store, the accuracy required is 2×2.

The logic behind is binary on/off. If device A can detect device B, it is assumed that device B can detect device A.

Conversely, if device A cannot detect device B, it is assumed that device B cannot detect device A.

This is a simplification as the following issues may interfere with this logic:

Static bodies such as walls may interfere with the detection and may vary with time, wind temperature etc.

Moving bodies, such as people may add further variability to make a medium with permeability which changes with respect to time;

Broadcast is not equal in all directions

The statistical probability of detecting a device depends upon background noise, the position of the device etc.

Receivers are not synchronized between them and they do not take measurements at fixed time intervals.

Cellular devices are roaming devices, which introduces errors in the time value of the Bluetooth detection.

One or more embodiments of the present invention therefore provide a large number of ICMs to a location, such as a store. The ICMs are deployed at positions to optimize their individual and cumulative chance of detecting a roaming device.

One or more embodiments of the present invention further provide ICMs of different radii of detection, thus at a hot spot, such as at a cheese counter in a supermarket, the ICMs will be deployed to provide a high resolution of detection.

Reference is now made to FIG. 8A, which is a simplified pictorial illustration of a GLocal site homepage 800 on a GLocal cellular communication device 600, in accordance with an embodiment of the present invention.

Device 600 comprises a GLocal browser 152. The device further includes in-built Glocal features including a search Glocal button 622, a GLocal favorites button 624 and a "find Glocal sites around me" button 626. These buttons may be protruding or may be built-in to a touch screen, depending on the device design. The screen further has a home page button 802 and a settings button 816.

The GLocal network allows transfer of information from real physical sites to virtual sites and vice versa.

It should be understood that a GLocal site

Additionally, home page 802 comprises a button or link 804 to an NSOF social glocal site, a picture share button. A user may upload pictures from the device and drag or otherwise provide the file in onscreen slot 818.

The screen may further comprise a picture friend button or link 806. A user may upload pictures from the device and drag or otherwise provide the file in onscreen slot 820.

A user may further press button 810 "friends and people around" 810. Device is then operative to search for devices in the vicinity of device 600 and will upload user names to slot 822.

The device may also comprise a personal database button 812, which may be used to add/retrieve data from an on-device database.

A Proxipedia button 814 may also appear on screen which enables the user to use the on-device Proxipedia function, as described herein.

A user of the device can perform searches using the GLocal browser without using standard internet tools. For example, upon pressing "find Glocal sites around me" button 626, a list of sites within a certain radius of the device will appear on screen 602, as was explained hereinabove with respect to FIG. 4.

Reference is now made to FIG. 6B a simplified pictorial illustration of a block diagram of data mining advanced features of the system of FIG. 1A.

Device 130 comprises a GLocal browser 132. The device further includes in-built Glocal features including a search Glocal button 622, a GLocal favorites button 624 and a "find Glocal sites around me" button 626. These buttons may be protruding or may be built-in to a touch screen, depending on the device design. The screen further has a home page button 802 and a settings button 816.

The deployment of the GLocal ICMs at known static predetermined locations, enables enhanced gathering of information relating to GLocal devices proximal to those locations. Since the deployment is pre-designed and optimized according to population density and business activity density. For example, if a GLocal ICM is placed in a bicycle store, then data can be gathered relating to bicycle users. If at least one GLocal ICM is placed at each bicycle store in a store chain, then one can set up a virtual community of bicyclers. The GLocal system can gather information relating to the purchasing trends of the virtual community, their frequency of visiting the store or stores, their age group, etc.

Additionally, home page 802 comprises a button or link 804 to an NSOF social glocal site, a picture share button. A user may upload pictures from the device and drag or otherwise provide the file in onscreen slot 818.

The screen may further comprise a picture friend button or link 806. A user may upload pictures from the device and drag or otherwise provide the file in onscreen slot 820.

A user may further press button 810 "friends and people around" 810. Device is then operative to search for devices in the vicinity of device 600 and will upload user names to slot 822.

The device may also comprise a personal database button 812, which may be used to add/retrieve data from an on-device database.

A Proxipedia button 814 may also appear on screen which enables the user to use the on-device Proxipedia function, as described herein.

It should be understood that the GLocal site 189 utilizes features, which are in-built into device 600 or device 130 (FIGS. 6A-6B), such as, but not limited to a camera, GPS and Bluetooth. The Glocal device thereby receives application code from cellular and other roaming devices. Thus the GLocal network forms cellular applications, which can be found using the GLocal browsers on the devices. This includes search for proximal and local business sites, local people, proximal friends etc. Every cellular phone user can find this information without having to have it installed on his cellphone.

In one embodiment, a user of a mobile device, such as device 150 (FIG. 1A) drives in his car from one place, such as a rural house, towards a destination, such as a theater in a city. As he approaches the destination, his device detects the presence of a number of devices in a detection step 702, such as seventeen. The detection may be due to any one or more of the following mechanisms (see also FIGS. 1A and 1B)

Device 130 and other devices (not shown) communicate directly with device 150.

Devices 181, 183, and 185 communicate directly with device 150

Device 130 and other devices (not shown) communicate directly with ICM 120, which communicates with device 150

Devices 181, 183, and 185 detect device 130 and other devices (not shown). Devices 181, 183, and 185 communicate directly with device 150

Devices 181, 183, and 185 detect device 130 and other devices (not shown) and communicate with ICM 120, which transfers data directly to device 150

Any of device 130 and other devices (not shown) communicate with one or more antennae 106 which communicate with cell phone service provider 135, which communicates with device 150

Any of device 130 and other devices (not shown) communicate with one or more antennae 106 which communicate with cell phone service provider 135, which communicates with service provider server 104, which communicates with device 150

Any of device 130 and other devices (not shown) communicate with one or more antennae 106 which communicate with cell phone service provider 135, which communicates with service provider server 104, which communicates with ICM 120, and ICM 120 communicates with device 150

Any other communication route between detected devices 130 and other devices (not shown) and device 150 which is feasible using the systems described herein and/or illustrated in the drawings.

In a receiving step 704, the service provider server 104 (i.e. the GLocal server) receives data associated with the signals received in device 150. In this example, the data relates to seventeen devices.

In a first checking step 706, the server checks to see if the device belongs to a registered user and is a "registered device" in database 308 (FIG. 3).

If no, in an first updating step 708 the server adds the non-registered device to a non-registered device and user list 309 in database 308 (not shown (FIG. 3)). If yes, in a second updating step 710 the device is added to a registered device and user list 311 within database 308.

In a second checking step 712, the server checks to see if all devices detected in step 702 have been allocated into either the registered list or the non registered list. If no, then the next detected device from step 702 is found in a go-to step 714.

If yes, then a list provision step 716 is performed by server 104 and the server provides user device 150 with non-registered device and user list 309 and registered device and user list 311. The list may include details relating to the user, such as age, gender, profession, and details of the device model.

In a selecting step 718, the user can decide which of the users he wants to add to his personal database 159 (not shown) in a memory 157 (not shown) on his device 150, thereby updating and forming his personal database 159. He may do this as a function of certain parameters received in lists 309, 311. For example, if he is a 28 single male, he may only be interested in males aged 25-32 and females aged 20-26.

It should further be understood that there may be filters used to limit the type and quantity of data and to ensure safe transfer of data from one device to another. Moreover, a user can upload data onto his device, which will be ranked according relevance in that category, by methods known in the art. The relevance may be ranked in accordance with history, reliability of data source, cross-correlation of data from different sources, key words, statistical algorithm parameters and any other suitable ranking parameters.

The references cited herein teach many principles that are applicable to the present invention. Therefore the full contents of these publications are incorporated by reference herein where appropriate for teachings of additional or alternative details, features and/or technical background.

In the context of the present invention, the following definitions apply:

The term "node" is intended to include a communication device, such as a computer, associated with at least one authenticated individual or peer;

The term "user" is intended to include a human, organization or device which uses the system and method described below and enters or views data entered or database items generated in accordance with the invention.

The terms "network" or "computer network" are intended to include any communication network that permits many users to communicate with one another, exchange information and files, etc. The network is in particular the Internet, although not exclusively. The network may also be, for example, an Intranet. The term "network" should be construed in a broad sense as including different forms of communication that permit transmission of data between a plurality of data transceivers. This includes, but not limited to, computerized networks such as the Internet in which computerized devices, e.g. personal or handheld computers, can be employed for entering and/or receiving data; it may be a line telephone network, in which data may, for example, be entered through the use of the numerical keyboard, e.g. by following an audible menu; a cellular network, through which users communicate using mobile communication devices; and any combinations thereof.

The term "path" is intended to include a sequence of nodes or vertices in a topological graph or a physical e.g. digital construct corresponding thereto. A path typically has "terminal" nodes or vertices including first and last nodes which may be termed the "start vertex/node" and "end vertex/node" respectively, and other nodes/vertices which may be termed "internal".

POS—Point Of Sales

RFID Radio frequency identification—see http://en.wikipedia.org/wiki/Radio-frequency_identification Static agent— a GLocal ICM UART—(universal asynchronous receiver/transmitter—see en.wikipedia.org/wiki/Universal_asynchronous . . . /transmitter

EXAMPLES

Consumer Centric Mobile commerce Application: A highly compatible electronic wallet system—which allow entering any POS, watch inventories, order items and Paying for them using (mostly) mobile devices creating an advanced user experience based on analyzing what is the best order is for the consumer any time and any place.

Business Analytics: Gathering and processing data regarding mobile entities equipped with mobile electronic devices with or without specific identities. Collecting their position along time and processing it.

Figure 7:
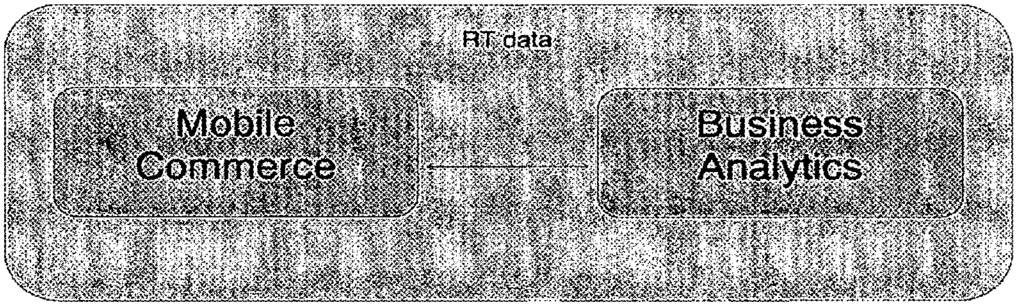
FIG. 7 is a simplified pictorial illustration of an embodiment of the invention.

Having these two products, such as illustrated by FIG. 7, enhances each of them with additional functionality. A technical description of the two products follows.

Example 1

Mobile Commerce

The Commerce System lets users of the system, mobile phone owners, to execute purchases in a comfortable, homogeneous and safe way. It provides a highly compatible environment for mobile commerce, allowing the end consumer to do whatever the POS functionality allows, limited only with the configuration defined by the business which owned the POS.

Figure 8:
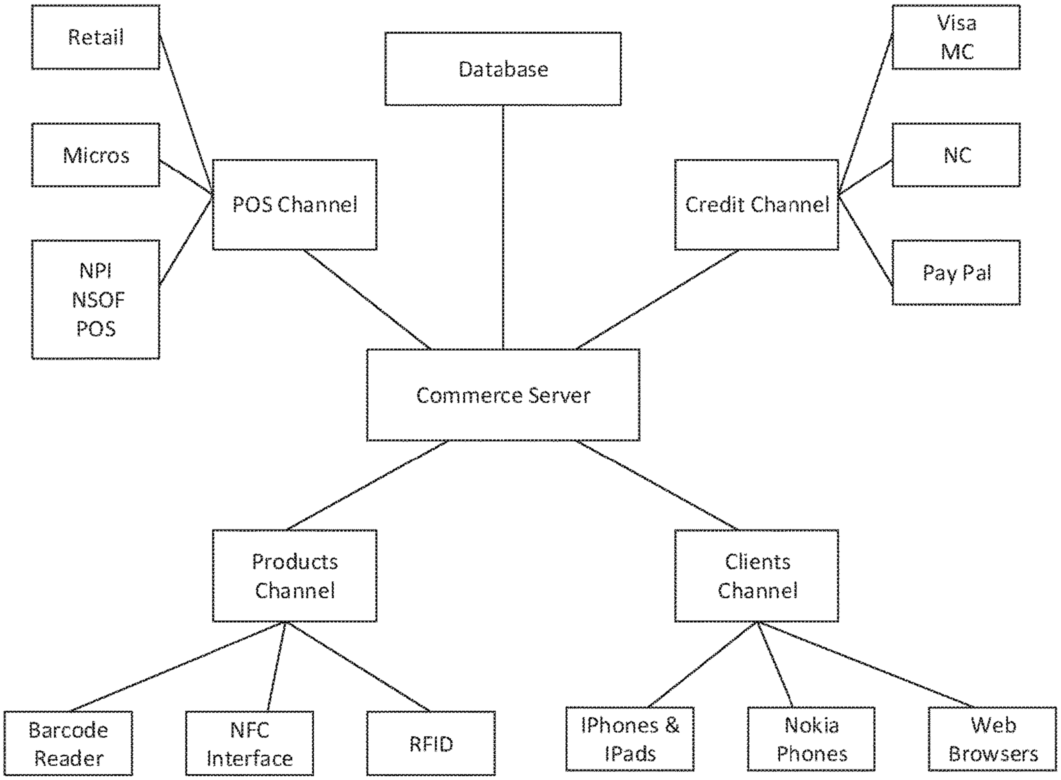
FIG. 8 is a simplified pictorial illustration of an embodiment of the invention.

The heart of the system is a server which serves four separate channels that combined allows to issue a full purchase cycle. Each of the channels has multiple interfaces to different end users or providers. These multiple interface modules, such as illustrated by FIG. 8, allow the system to be highly compatible and flexible.

1. Credit or Payment channel. This channel handles the payment process of a purchase. This channel includes interfaces to the different credit card companies, Pay Pal, NFC hardwere, and others.

2. Mobile devices channel. It handles the interfaces to the different mobile devices. This includes not only smart phones of all types and shapes but also lower level phones as well as laptops, iPads and such. It provides on all supported devices a common GUI for the user and creates the familiar homogeneous purchase environment. It also handles all the data encryption of sensitive data on the local devices and the communication between the devices and the server. Initially Symbian S40 and S60 phone devices will be supported as well as some proprietary operating systems mobile devices, and also browser based devices.

3. POS side channel. This channel handles the actual purchase handshake. It interfaces to the different POS systems at the business side. It supports most existing POS manufacturers. It will supportstandards 4. Product channel. This channel will allow the user to select the product he wishes to purchase in a comfortable way and get additional information about it. It will support different interfaces such as RFID, Barcode, NFC, picture based product recognition, and also the more traditional ones such as entering manually an item code or selecting from a list (or menu). Its main purpose is to make the link between the physical product to purchase at a specific retailer or shop and its item code, price and description.

A General Purchase Process:

A purchased in general is taking the following steps:

1. A user steps in to a shop or alternatively decides he wants to order an item from a specific shop.

2. In the first case, the application opens automatically with the current shop page (in case the user's configuration is set for that), otherwise he needs to select the shop. He selects the menu/catalog. The application sends a request to the shop/POS to fetch the updated list of items available with their prices with additional shop and items data. The browse through it to select the single item or list of items he wishes to purchase.

3. The user has to choose the delivery style: Serve to the table, A take away, A delivery—send to, should be ready in [x] minutes, . . . , etc.

4. The user is being asked for payment method: Credit of customer (the shop), PayPal, others . . . .

5. Last, the user is being asked to enter a pin code. This pin code was selected by him at the time of registration.

6. Assuming all details were found to be fit, the order is being processed. The commerce server handles the order: The Credit/payment company is getting the payment details. Assuming a payments approval, the items ordered are sent to the POS at the business's shop. The user is getting a receipt of the order.

7. In case there is no POS system, there is an option to install a printer at the customer's site and print the orders arriving.

Both the user and the business can see all orders and a summary in real time in the web, at the provider's web site. In addition, the business receives a periodical summary report of the orders issued through the system. Also the user may receive a summary report periodically or upon a specific request.

8. On a monthly or any other periodic basis, money saved will be transferred to the account to each specific shop after reducing the commission taken. All money transfers are recorded and based on the orders and transactions made by the users. Invoices are sent between NSOF and the shops to fulfill the finance records.

Example 2

Analytics

Sensors Based Analytics

The sensors collect electromagnetic signature from mobile electronic devices owned by people. This data comes mostly from the Bluetooth devices but not limited to that. It may be also be WiFi or other transmitting devices like GSM, NFC, RFID etc.

All this information is being transmitted in real time to the Analytics server where it is being stored in a database (ADB). In some exceptional cases scanned data is being stored locally at the sensor device or at an intermediate server for local use or later use by the Analytics server.

The collected information in the Analytics server contains basically 3 major components:

1. Unique ID based on transmitter signature.
2. Time based on the time the data is received.
3. Location based on the assumption that the sensor location is known.

In case a location of a sensor is dynamic, e.g. a sensor on a bus or on a mobile device, the physical location is not fixed. In such cases, as the system is aware of the business category and type, the sensors are handled accordingly: Either no geographical information is extracted or relative position is taken or relevant GPS data is fetched. Location source/resolution is an entity being kept as well.

The above information is the sensor based Analytics.

The businesses can be divided into several groups:

1. Small customers: customers that have a single sensor. This is usually a small to medium size facility like a coffee shop. The sensor usually covers the full area of the store.

2. Large customers: Customers with a larger facilities where more than 1 sensor is being installed in order to cover a larger area and sometimes to cover masses of clients.

3. Complex customers: Customers, usually not small customers but rather medium or large retailers that need extra information on clients densities in the store. These complex customers will get real time or off line analysis of clients' movements in their facility.

From the collected data in the ADB, basic information on users (unique Ids) can be extracted and they can be categorized based in different segmentations:

- Based on frequency/duration of visiting a specific location.
- Segmentation based on frequency/duration of visiting a specific location category.
- Segmentation based on frequency/duration of visiting a geographic area
- The above two based on Time of Day (TOD) (morning, evening . . . ).
- Segmentation of locations based on quantity and durations of visits
- Compression between locations and/or categories. The above based on TOD.
- Segmentation by grouping—Are people in repeated groups or variant groups of people. In other words—Is a user commonly meeting the same group of people?
- Change and relative change of statistics over time On top of these basic we can extract a compound segments which combines different base segments.

These are some examples of pure ADB segmentations:

- VIP visitors
- Recurring/regular visitors
- Big spenders
- Living in the area
- Social leaders
- And more . . . .

Mobile Cell (MC) Based Analytics

Additional information from the Commerce server is being sent to the Analytics server as well. This information is composed of:

1. Unique ID which is customer's login name in the commerce server. This may or may not contain the transmitter signature detected by the sensors.
2. Time based on the time of the transmitted transaction.
3. Location of the user during a purchase. This data will not always be available but in some cases by either getting it from the sensor around and sometimes by extracting it from the user's GPS or LBS data.
4. Transaction and purchase data.
5. Shop data which includes category of the business, its name, location, more . . . .

This is the MC based Analytics data.

From this data information can be extracted about users and they can be categorized into different segments:

- Purchase habits of a user—Frequency and type of purchased items
- Shop performance
- Relation between different shops using the clients as their link The Analytics Server gets all the above data including the sensor based data and the commerce data and stores it continuously along time axis.

The outcome from the Analytics server is the Analytics data. This can be seen as off the shelf data that can supply. No need for any external data from an external system.

To summarize, The Analytics data comprises:

- history of all intercepted mobile devices according to time and location Correlation between mobile devices clients according to a variety of parameters
- Identification of non mobile devices identities using advanced mathematic algorithms based on intercepted mobile devices
- Real time and off line clients behavior at a specific store/location/movements/sector/etc viewed on monitors, web pages, etc.

The Analytics server goes a step further and can execute activities based on events found in the data. Example of this activities are: sending an SMS or a bluetooth message or an email to the user or an employee/employer, displaying an alert to the customer regarding a specific user (client), displaying specific information in a display or making an audio or a video message.

Example 3

Data Fusion

Figure 9:
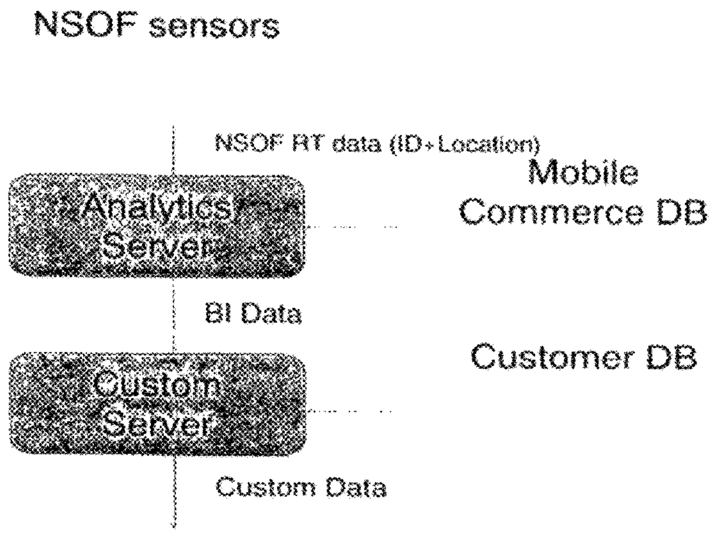
FIG. 9 is a simplified pictorial illustration of an embodiment of the invention.

As illustrated by FIG. 9, taking the Analytics to the next level requires involvement and some means of integration with a customer to provide custom data.

A customer provides data regarding its clients such as:

1. Unique ID like Member ID or phone number or other.
2. Time and place information such as the time and place the client paid for a purchase.
3. Any other Information specific to its client that the customer wishes to cross with desired data.

As a result, a custom server creates a link between the customers' provided data and the collected data. At this point, the customer receives custom data on the specific clients which include the collection of the Analytics data with the existing client data. This information can vary widely according to customer needs. Since this is customized data, it is capable of being tailored to customer needs and therefore any derivative of the core data collected and the customer is made. The customer is able to receive both real time data like "A VIP customer named Mr. Jones has just entered your shop" and also non RT data/reports such as statistical data of clients such as "The percent of clients that entered the shop and didn't buy anything".

The system described provides the customer the means of defining categories of clients using templates, filters and queries. With the help of these templates and using statistical data (which is being collected inside the customer's premises and also outside at different NSOF sites), the customer receives very high end (intelligent) data.

Example of data that can be retrieved includes but is not limited to:

- A golden card member that steps into a shop—The system can send an alert to the customer or a welcome message to the client.

More examples see in the other documents.

Example 4

The Search Engine

Based on the real time information extracted from the sensors data, and on the offline information created in the automatic reports, a search engine is made which notifies in real time events in the real world and on relevant information regarding real locations and events.

Every meaningful information created with the system described, is tagged automatically and/or manually, with relevant vocabulary, so after clicking the relevant words in the search box, all relevant information appears.

Hereinbelow are examples for such information regarding real location and real time event, which can be extracting automatically:

1. Gathering of people for purposes of parties, demonstrations, shows, movies, etc.—combining information about places type and crowd
2. Distribution of different type of people around the city (coffee lover, Jazz lover, etc.)
3. Popular places in the city
4. Where the popular people hanging out in the city
5. Crowded places and roads—online/offline
6. Comparative research and marketing research—based on automatic reports
7. Etc.

Example 5

Automatic Reports System (ARS)

The system contains 2 type of modules set which the customer (business/private/academic) chooses from: [1] analytics modules; [2] locations.

Choosing only analytics modules, gives the chooser analytics reports regarding the location where he qualifies as its manager. Choosing other locations modules than its own, gives the chooser comparative reports between those locations to its own location.

These reports are created automatically in the ADB

It is to be understood that the invention is not limited in its application to the details set forth in the description contained herein or illustrated in the drawings and described in the Examples. The invention is capable of other embodiments and of being practiced and carried out in various ways. Those skilled in the art will readily appreciate that various modifications and changes can be applied to the embodiments of the invention as hereinbefore described without departing from its scope, defined in and by the appended claims.

What is claimed is:

1. A method of performing a transaction through a server comprising a location module, a proximity module, and a communication interface, said method comprising:

monitoring a plurality of roaming communication devices, wherein said roaming communication devices are adapted to communicate via a communication network;

detecting, through the communication interface, a signal from a roaming communication device of the plurality of roaming communication devices, the signal specifying a proximity of the roaming communication device to a locally distributed communication module;

retrieving device data regarding the roaming communication device based on the signal;

determining, based on the proximity indicated by the signal, a position of the roaming communication device;

identifying, based on at least the position, position-dependent data located within a predetermined distance from the roaming communication device;

retrieving the identified position-dependent data;

providing the position-dependent data to the roaming communication device;

transmitting, through the communication interface, the device data to the locally distributed communication module related to the position-dependent data;

receiving, through the communication interface, interaction data regarding at least one interaction between the roaming communication device and the locally distributed communication module;

updating the device data based on the received interaction data; and transmitting, through the communication interface, the updated device data to the locally distributed communication module, wherein, the device data comprises a notification regarding the roaming communication device and an average time in which the roaming communication device resides at a site associated with the locally distributed communication module, and the updated device data comprises an optimized notification based on the received interaction data.

2. The method of claim 1, further comprising:

analyzing proximity information from the signal;

determining from proximity information within the signal the roaming communication device is approaching the locally distributed communication module; and sending a notification to the locally distributed communication module based on the determining step.

3. The method of claim 1, wherein the position-dependent data identifies a commercial entity located within a predetermined distance from the roaming communication device.

4. The method claim 3, wherein the locally distributed communication module is associated with the commercial entity.

5. The method of claim 1, further comprising:

receiving, from the roaming communication device, a first input, indicating a first selection of at least one item from the position-dependent data;

receiving, from the roaming communication device, a second input indicating a second selection of a delivery method;

receiving, from the roaming communication device, a third input indicating a third selection of a payment method;

sending the transaction to the locally distributed communication module after receiving the first, second and third inputs; and sending, to the roaming communication device, a receipt of the transaction.

6. The method of claim 1, wherein the location module performs the determining, from the signal, a position of the roaming communication device.

7. The method of claim 1, wherein the proximity module performs the identifying, based on at least the position, position-dependent data located within a predetermined distance from the roaming communication device.

8. The method of claim 1, wherein the monitoring and detecting steps occur through a mobile devices channel of the communication interface, the providing step occurs through a product channel of the communication interface, and the reporting step occurs through a point-of-sale channel of the communication interface.

9. The method of claim 1, wherein the interaction data comprises information regarding at least one action performed by the roaming communication device.

10. The method of claim 9, wherein the information regarding an action performed by the roaming communication device comprises a time when the roaming communication device enters or exits a store associated with the locally distributed communication module.

11. The method of claim 9, wherein the information regarding an action performed by the roaming communication device comprises data regarding a purchase of an order by a user of the roaming communication device.

12. The method of claim 1, wherein the notification comprises optimized order handling data, a category in which a user of the roaming communication device belongs.

13. The method of claim 1, further comprising:

analyzing the interaction data; and classifying a user of the roaming communication device based on the analyzed interaction data.

14. The method of claim 1, further comprising the roaming communication device communicating directly with the locally distributed communication module.

15. The method of claim 14, wherein the roaming communication device performs the communicating step in response to an instruction from the server.

16. The method of claim 1, further comprising the roaming communication device communicating directly with a second roaming communication device of the plurality of roaming communication devices.

17. The method of claim 16, wherein the roaming communication device performs the communicating step in response to an instruction from the server.

18. The method of claim 1, further comprising wherein the updated locally distributed communication module data comprises optimized order information relating to a business associated with the locally distributed communication module.

* * * * *